(12) United States Patent
Lim et al.

(10) Patent No.: US 8,270,996 B2
(45) Date of Patent: Sep. 18, 2012

(54) RECEIVING SYSTEM AND METHODS FOR PROCESSING BROADCASTING SIGNAL

(75) Inventors: In Jae Lim, Gyeonggi-do (KR); In Hwan Choi, Gyeonggi-do (KR); Kook Yeon Kwak, Gyeonggi-do (KR); Byoung Gill Kim, Seoul (KR); Won Gyu Song, Seoul (KR); Jong Moon Kim, Gyeonggi-do (KR); Jin Woo Kim, Seoul (KR); Hyoung Gon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1083 days.

(21) Appl. No.: 12/058,442

(22) Filed: Mar. 28, 2008

(65) Prior Publication Data

US 2008/0242258 A1    Oct. 2, 2008

(30) Foreign Application Priority Data

Mar. 30, 2007 (KR) .................... 10-2007-0031438

(51) Int. Cl.
*H04W 24/00* (2009.01)
(52) U.S. Cl. ............... 455/456.3; 455/414.3; 455/456.1; 455/77; 455/90.1; 375/240.01; 375/240.26; 375/240.27; 375/240.28; 725/68; 725/70; 725/71
(58) Field of Classification Search ............... 455/414.3, 455/456.1, 456.3, 77, 90.1, 3.02, 3.06; 375/240.01, 375/240.26–240.28; 725/68, 70, 71
See application file for complete search history.

(56) References Cited

U.S. PATENT DOCUMENTS

| | | | |
|---|---|---|---|
| 6,330,453 B1 * | 12/2001 | Suzuki et al. ................. | 455/457 |
| 2004/0221325 A1 * | 11/2004 | Nakajima et al. ............. | 725/145 |
| 2005/0128102 A1 * | 6/2005 | Obradovich et al. ......... | 340/905 |
| 2005/0169205 A1 * | 8/2005 | Grilli et al. .................... | 370/313 |
| 2006/0002389 A1 | 1/2006 | Lee | |
| 2006/0178153 A1 * | 8/2006 | Tenny et al. .................. | 455/450 |

FOREIGN PATENT DOCUMENTS

| WO | WO 03/032148 | 4/2003 |
|---|---|---|
| WO | WO 2007/018397 | 2/2007 |

* cited by examiner

*Primary Examiner* — Dwayne Bost
*Assistant Examiner* — Yungsang Lau
(74) *Attorney, Agent, or Firm* — Lee, Hong, Degerman, Kang & Waimey

(57) ABSTRACT

A receiving system comprises a first module configured to receive location information identifying current location of the receiver, a second module configured to receive a broadcasting signal including cell information which includes first information defining a location of each cell and second information defining a transport channel of each cell, extract the cell information, select a cell according to the extracted cell information, tune to a transport channel of the selected cell, and processing a broadcast transported from the tuned transport channel, a storage medium, and a controller configured to control to extract the cell information which is matched with the received location information, select the cell, tune to the transport channel of the selected cell, and process the broadcast transported from the tuned transport channel.

9 Claims, 18 Drawing Sheets

FIG. 6

| Field Name | Number of Bits | Description and Field Value |
|---|---|---|
| cell_information_table_section { | | Start of the master_guide_table_section(). |
|   table_id | 8 | 0xCE |
|   section_syntax_indicator | 1 | 1b, The CIT uses the MPEG "long-form" syntax. |
|   private_indicator | 1 | 1b, Set to 1 in PSIP tables |
|   reserved | 2 | 11b, Reserved bits are set to 1. |
|   section_length | 12 | section_length is limited to 1021. |
|   transport_stream_id | 16 | |
|   reserved | 2 | 11b, Reserved bits are set to 1. |
|   version_number.... | 5 | The version of a table section. |
|   current_next_indicator | 1 | 1b |
|   section_number | 8 | |
|   last_section_number | 8 | |
|   protocol_version | 8 | 0, currently defined in s for protocol_version zero. |
|   num_cells_in_section | 8 | Specifies the num of cells |
|   for(i=0;i<num_cells_in_section;i++) { | | |
|     cell_id | 8 | This 8-bit field acts as the database linkage between the MGT and CIT |
|     cell_text | 7*16 | Seven Unicode UTF-16 encoded characters, representing the "cell name" of the cell |
|     cell_location | 7*16 | Seven Unicode UTF-16 encoded characters, representing the "cell location" of the cell |
|     num_channels_in_cell | 8 | Specifies the channel num of each cell |
|     for(j=0;j<num_channels_in_cell;j++) { | | |
|       major_channel_number | 10 | |
|       minor_channel_number | 10 | |
|       modulation_mode | 8 | enumerated type field that indicates the modulation mode |
|       carrier_frequency | 32 | Specifies carrier frequency |
|       channel_TSID | 16 | |
|       program_number | 16 | |
|       reserved | 6 | |
|       descriptors_length | 10 | |
|       for(k=0;k<N;k++) { | | |
|         descriptor() | | |
|       } | | |
|     } | | |
|     descriptors_length | | |
|     for(k=0;k<N;k++) { | 10 | |
|       descriptor() | | |
|     } | | |
|   } | | |
| descriptors_length | 10 | |
| for(i=0;i<N;i++) { | | |
|   descriptor() | | |
| } | | |
|   CRC_32 | 32 | A 32-bit checksum error detection code. |
| } | | |

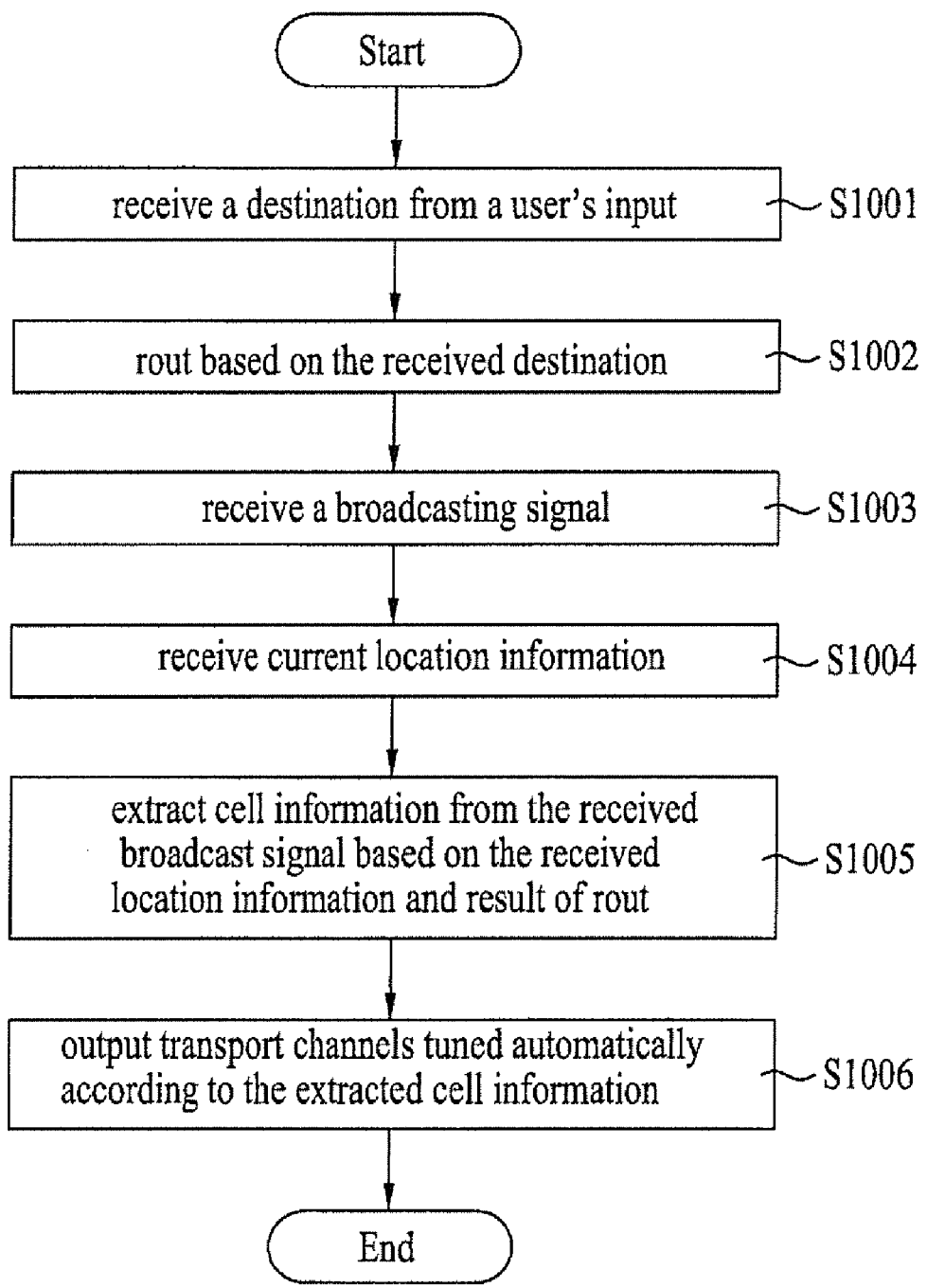

FIG. 14
(a) In Cell A
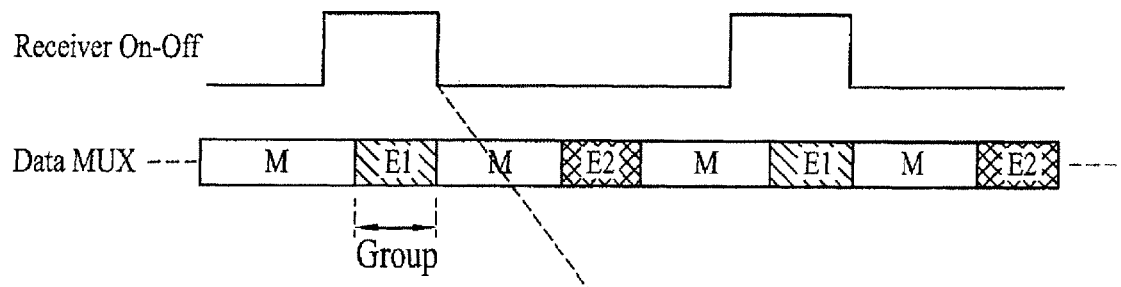
(b) In Cell B
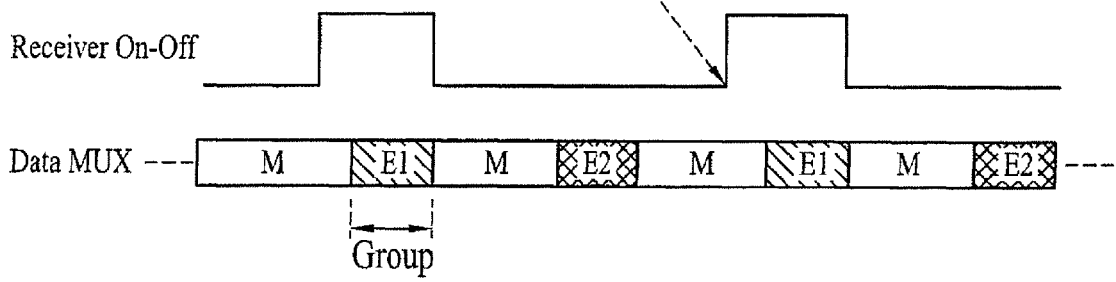
M : main data
E1, E2 : Mobile data

RECEIVING SYSTEM AND METHODS FOR PROCESSING BROADCASTING SIGNAL

This application claims the benefit of the Korean Patent Application No. 10-2007-0031438, filed on Mar. 30, 2007, which is hereby incorporated by reference as if fully set forth herein.

BACKGROUND OF THE INVENTION

1. Field of the Invention

The present invention relates to a receiving system and methods for processing broadcasting signal. Although the present invention is suitable for a wide scope of applications, it is particularly suitable for processing a broadcast signal received using a location information module and navigation.

2. Discussion of the Related Art

Generally, there is a device loaded in a vehicle or the like to display a location resulting from calculating a current location of the vehicle or the like on a screen, search for a route to a destination and display a guide route to the destination. And, the device includes a navigation system for example.

In case of attempting to receive a broadcast in a currently moving vehicle that is not fixed to a specific location, more powerful error correction capability is needed to process various errors exiting on a transport channel.

However, in North America broadcasting environment, for example, broadcast transmission standard for the mobile reception has not been decided. Such an environment fails to provide a user of vehicle with opportunity for broadcast reception regardless of time and place.

SUMMARY OF THE INVENTION

Accordingly, the present invention is directed to methods for processing a broadcasting signal in a receiver and a receiving system that substantially obviate one or more problems due to limitations and disadvantages of the related art.

An object of the present invention is to provide a method for processing a broadcasting signal including cell information in a receiver, of which the method uses the cell information matched with location information on current location of the receiver.

Another object of the present invention is to provide a method for processing a broadcasting signal including cell information in a receiver, of which the method uses the cell information matched with routing information on user's destination input.

Another object of the present invention is to provide a receiving system for processing a broadcasting signal including cell information, of which the receiving system uses the cell information matched with location information on current location of the receiving system and routing information on user's destination input.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for processing a broadcasting signal in a receiver, the method includes receives the broadcasting signal including cell information, wherein the cell information includes first information defining a location of each cell and second information defining a transport channel of each cell, receives location information identifying current location of the receiver, extracts the first information matched with the received location information, selects a cell according to the extracted first information, extracts the second information in accordance with the extracted first information, tunes a transport channel of the selected cell according to the extracted second information, and processes a broadcast transported from the tuned transport channel.

In another aspect of the present invention, there is provided processing a broadcasting signal in a receiver, the method includes receives the broadcasting signal including cell information, wherein the cell information includes first information defining a location of each cell and second information defining a transport channel of each cell, receives location information identifying current location of the receiver, extracts the plurality of first information matched with the received location information, selects a cell having a largest magnitude of signal power among each cell according to the extracted first information, extracts the second information in accordance with the selected cell, tunes a transport channel of the selected cell using the extracted second information, and processes a broadcasting transported from the tuned transport channel.

In another aspect of the present invention, there is provided processing a broadcasting signal in a receiver, the method includes receives the broadcasting signal including cell information, wherein the cell information includes first information defining a location of each cell and second information defining a transport channel of each cell, receives location information identifying current location of the receiver, extracts the plurality of first information matched with the received location information, selects at least one of a nearest cell to a current tuned cell and a next cell into which will move away among each cell according to the extracted plurality of cell information, extracts the second information in accordance with the selected cell, tunes a transport channel of the selected cell using the extracted second information, and processes a broadcasting transported from the tuned transport channel.

In another aspect of the present invention, there is provided processing a broadcasting signal in a receiver, the method includes receives a user's input on a destination, receives routing information routed according to the received user's input, receives the broadcasting signal including cell information, wherein the cell information includes first information defining a location of each cell and second information defining a transport channel of each cell, receives locating information identifying current location of the receiver, extracts the first information matched with the received rout information, selects a cell according to the extracted first information, extracts the second information in accordance with the selected cell, tunes a transport channel of the selected cell using the extracted second information, and processes a broadcast transported from the tuned transport channel.

In another aspect of the present invention, there is provided processing a receiving system, the receiving system includes a first module configured to receive location information identifying current location of the receiver, a second module configured to receive a broadcasting signal including cell information which includes first information defining a location of each cell and second information defining a transport channel of each cell, extract the cell information, select a cell according to the extracted cell information, tune to a transport channel of the selected cell, and processing a broadcast transported from the tuned transport channel, a storage medium, and a first controller configured to control to extract the cell information which is matched with the received location information, select the cell, tune to the transport channel of the selected cell, and process the broadcast transported from the tuned transport channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is CIT section syntax containing information on cell according to one embodiment of the present invention;

FIG. 10 is a flowchart for a receiving method using routing information according to one embodiment of the present invention;

FIG. 14 is a diagram for concept in receiving broadcast data in case of handover executed by a broadcast signal transmitting/receiving method according to an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, overall concept of a mobile receiver according to the present invention is explained with reference to the following drawing.

Figure 1:
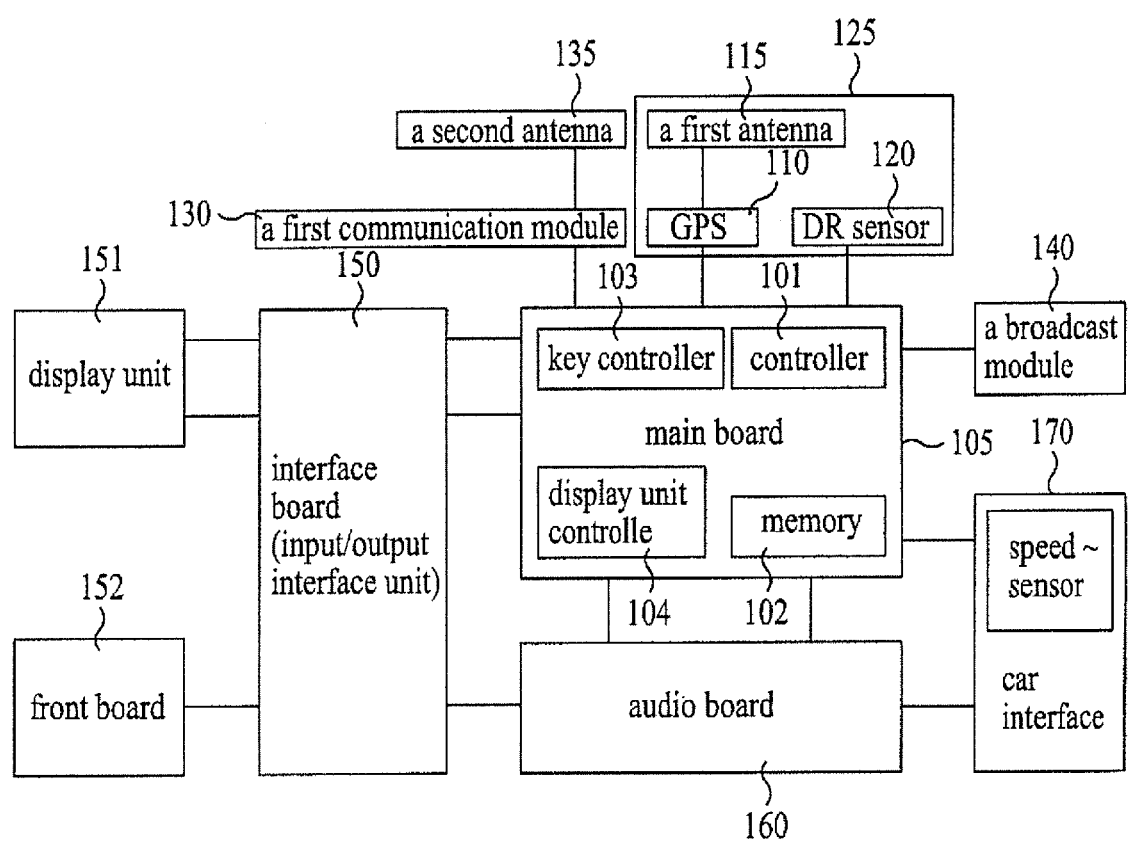
FIG. 1 is a block diagram of a mobile receiver for receiving its location information according to one embodiment of the present invention.

FIG. 1 is an overall block diagram of a mobile receiver capable of indicating location information according to one embodiment of the present invention.

Referring to FIG. 1, the mobile receiver is connected to various audio and video devices, is equipped with a navigation function, and is able to provide various services such as a wireless data service and the like. It is able to provide a seamless broadcast without additional manipulation using location information that is received in the course of moving.

The mobile receiver includes a location information module 125 including a GPS (global positioning system) receiving unit 110 connected to a main board 105, on which various devices are connected to provide a service, to receive location information and/or a dead-reckoning (DR) sensor 120 having at least one of sensors for determining a physical location and a broadcast module 140 receiving to process broadcast signals to provide a broadcast. And, the mobile receiver is able to provide routing information to a user by receiving the routing information according to a user input via a communication module 130.

The main board 105 can include a control unit (e.g., CPU) 101 controlling a receiver system overall, a memory 102 for storing various kinds of information necessary for basic control of the receiver system, a key control unit 103 controlling various key signals, and a display control unit 104 controlling a display unit 151.

The memory 102 can store map relevant information for example. In this case, the map relevant information is provided via an information center or the like or may be stored in the memory 102 in advance. And, the stored map information can be periodically updated via the communication module 130. The stored map information can be used to display a current location of the receiver by matching or to provide a moving route to a destination from a current location in case of a route search according to a user input. And, such side information for broadcast/communication as transportation information and the like is received and provided to a user under the control of the control unit 101 as well as the stored map information. Moreover, cell information corresponding to a broadcasting range of each transmitter can be stored in the memory 102 by being matched to the previously stored map information. In this case, the cell information can include at least one selected from the group consisting of information for identifying a cell and information on a transport channel of each cell.

The main board 105 is connected to the communication module 130 for transmission and reception of mobile communication signals and the location information module 125 including the GPS receiving unit 110 receiving information on a current location of the receiver with a prescribed period (e.g., 0.5 second) via a satellite for a location guide of a vehicle, a route guide from a departure to a destination and the like and the DR sensor 120 capable of receiving location information provided by the vehicle. The communication module 130 and the GPS receiving unit 110 receive signals via antennas 135 and 115, respectively.

In searching routes according to a user input, the communication module 130 receives transportation information for a shortest distance setup to a destination and the like or can receive information via inter-vehicle communication or from a transmitter of a separate information providing center or a transmitter provided to a road side. The communication module 130 is able to perform communication via a digital interface including at least one selected from the group consisting of WAP (wireless application protocol), CDMA 1xEV-DO (evolution-data only), wireless LAN (local area network), mobile Internet, WiBro (wireless broadband Internet), WiMAX (world interoperability for microwave access), HSDPA (high speed downlink packet access) and the like. Yet, the communication module 130 may not be provided within the mobile receiver if necessary.

The main board 105 connected to the broadcast module 140 receives broadcast signals at a current location of the receiver, is tuned to a channel according to a selection made by a user, receives a corresponding broadcast signal, processes the received broadcast signal, and then provides a corresponding broadcast programs. This is to seamlessly provide a broadcast program, which is being watched, using location information of the receiver, when the receiver is moving as well as the receiver is fixed to a specific place. Its details will be explained later. The main board 100 is connected to such a display unit 151 as a TFT LCD (thin film transistor liquid crystal display) and the like and a front board 152 controlled by the key control unit 103 via an interface board (input/output interface unit) 150.

The display unit 151 outputs various video signals and text signals. The display unit 151 is able to output the broadcast signal received and processed by the broadcast module 140. And, the display unit 151 is provided with a touch panel to receive user inputs. The front board 152 is provided with buttons for inputting various key signals and provides a specific key signal corresponding to the button selected by a user to the main board 105.

In the following description, a receiver, which is configured to receive and process a broadcast signal modulated by M-VSB in a broadcast module 140 within a mobile receiver according to the present invention and to provide keep providing a currently viewed broadcast seamlessly using location information despite that the receiver is moving, is explained in detail.

Figure 2:
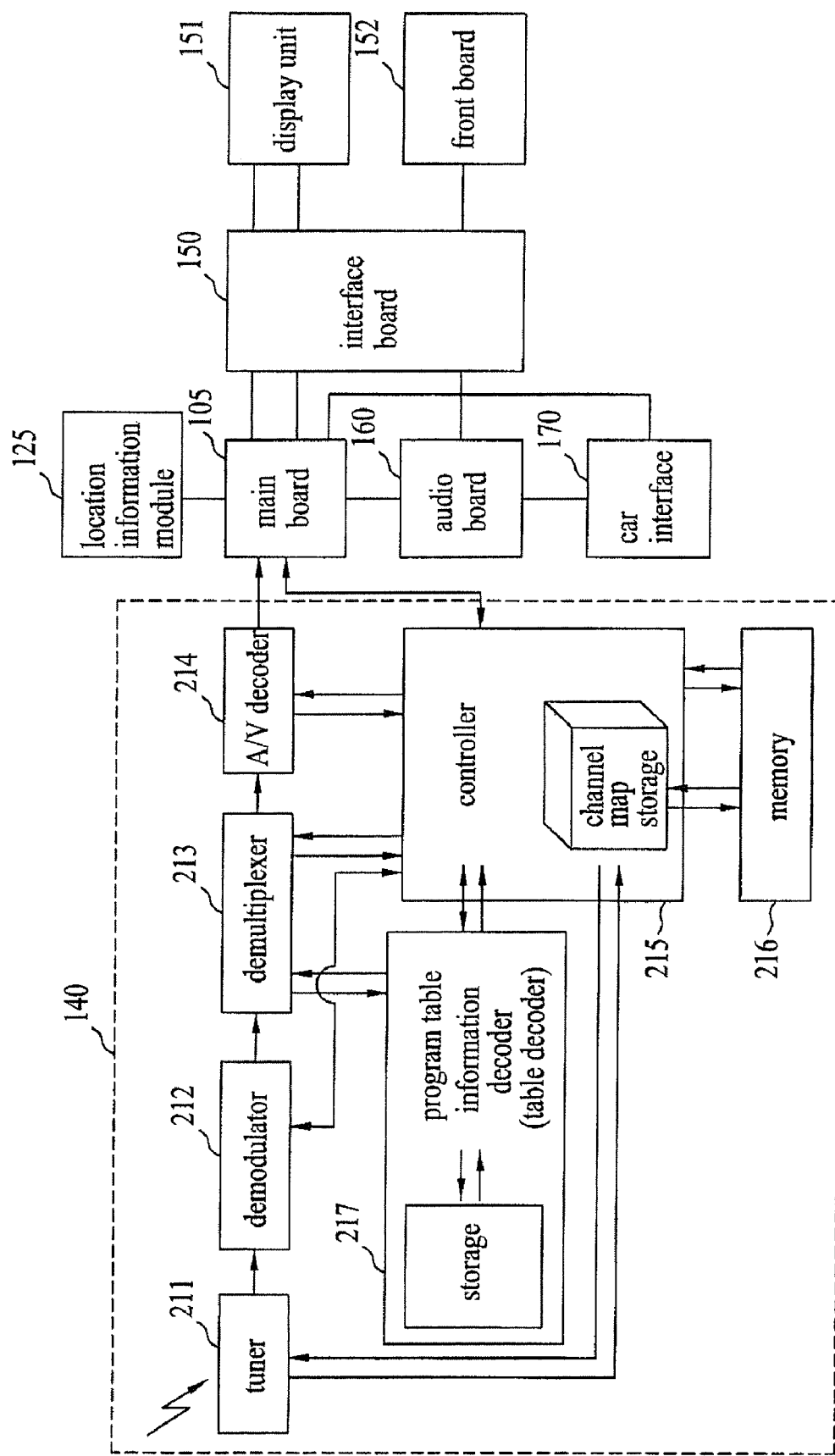
FIG. 2 is a block diagram of a mobile receiver including a location information module and a broadcast module according to one embodiment of the present invention.

FIG. 2 is a block diagram of a mobile receiver including a location information module 125 and a broadcast module 140 according to one embodiment of the present invention. Detailed configuration of the broadcast module 140 within the receiver shown in FIG. 1 is included in the reconfiguration shown in FIG. 2.

Referring to FIG. 2, the broadcast module 140 includes a tuner 211, a demodulator 212, a demultiplexer 213, a decoder 214, a controller 215, a memory 216 and a program table information decoder 217. Operations of the mobile receiver are explained as follows.

First of all, the tuner 211 is tuned to receive broadcast signals. In particular, the tuner 211 is tuned to a specific channel under the control of the main board 200 and then receives and outputs broadcast signals.

The demodulator 212 demodulates a broadcast signal transmitted by being modulated by M-VSB. Details of the demodulator 212 will be explained later in this disclosure.

The demultiplexer 213 may demultiplex program table information (PSI/PSIP) and an audio/video stream in the received signal. Alternatively, a broadcasting stream which will be recorded in or reproduced from a digital recording device may be received. For example, an input signal according to the IEEE-1394 may be directly received without the tuner.

The decoder 214 may decode the audio/video broadcasting signal demultiplexed by the demultiplexer 213. The decoder 214 decodes the audio/video elementary stream packet and outputs the decoded audio/video signal to the main board 105. The main board 105 outputs the decoded audio/video information via the display unit 151. At this time, the display unit 151 receives and outputs the audio/video signal decoded by the decoder 214. The display unit 151 includes an on-screen-display (OSD) unit for outputting a graphic signal displayed on a display screen.

The program table information decoder 217 may decode the program table information demultiplexed by the demultiplexer 213 and temporarily store the decoded program table information. The program table information decoder 217 may parse the table including the cell information, that is, the MGT (Master Guide Table), extract the cell information, and output the obtained cell information to the controller 215. In this case, if cell information is not stored in the receiver in advance, the program table information decoder 217 parses a cell containing cell information in the program table information, extracts temporarily stored information, and then outputs the extracted information to the controller 215. If so, the controller 215 is able to output the corresponding information to the main board 105. The program table information containing the cell information can be named CIT (Cell Information Table) for example. And, its details will be explained later.

The control unit 215 can include an interface unit 150 receiving a control signal according to user input information from the main board 105. The controller 215 stores channel map information in which a physical channel and a virtual channel are mapped such that the tuner 510 selects the channel, and controls the decoder 214 such that the broadcasting stream is output according to the channel request of the user. If the program table information decoder 217 parses the updated table information, the controller 215 stores the updated channel information in the channel map. For instance, when the receiver has moved away into one cell from another, if the channel information is updated, the updated channel information is stored in the channel map. Moreover, the controller 215 receives current location information of the receiver from the location information module 125, receives cell information matching the location information from the main board 105, and controls other control information such as information on application to be stored in the memory 216.

If the cell information matching the current location information of the receiver is not received from the main board 105, as mentioned in the foregoing description, the controller 215 receives CIT section containing the cell information, parses the received CIT section, and then transfers the parsed CIT section to the main board 105. The controller 215 receives again the information matching a current location of the receiver in the cell information transmitted from the main board 105 and then stores the re-received information. For instance, in case that the receiver moves away into one cell (cell-B) from another cell (cell-A), if cell information is not provided to the main board 105 in advance, the controller 215 provides a plurality of cell information by parsing CIT. The main board 105 selects information on the cell-B, which matches a current location of the receiver, from the provided a plurality of cell information and then transmits the selected information to the controller 215. If so, the controller 215 stores the corresponding information and then uses for broadcast processing.

If the receiver is currently located in an overlapped area where a plurality of cell information is received, the main board 105 should transmit a control signal for controlling the controller 215 to continuously providing a currently viewed broadcast. In particular, the main board 105 selects a prescribed cell from cell information matched according to current location information of the receiver, which keeps being received with a prescribed period, and should transmit a control signal to provide a broadcast by tuning through the controller 215.

In order to process a case that the receiver is currently located in the overlapped area, a previous cell is maintained intact and provided or specific cell information is controlled to be used by comparing strengths of received signals to each other. Its details are explained later.

The controller 215 is able to control the tuner 211, the demodulator 212, the demultiplexer 213, the decoder 214 and the like to keep providing a broadcast on a channel received and provided by being received from a cell prior to handover in accordance with a control signal of the main board 105 using channel information on a handed-over cell.

When the demodulator 212 extracts the cell ID (IDentifier) included in the signaling information, the controller 215 receives the cell ID and determines whether the handover occurs. If it is determined that the handover occurs, the program table information decoder 217 may parse the CIT information using the cell ID according to the signaling information included in the changed broadcasting signal. The controller 215 may control the tuner 211, the demodulator 212, the demultiplexer 213 and the decoder 214 to the process the broadcasting signal of the changed cell from the parsed information.

In the following description, operations in controlling the controller 215 within the broadcast module 140 are explained in detail. In this case, while the mobile receiver is moving, the main board 105 receives current location information of the receiver from the location information module 125 so that a currently viewed broadcast on a channel can keep being tuned and provided.

First of all, the location information module 125 provides location information to the main board 105. In particular, the location information module 125 includes at least one of the GPS receiving unit 110 and the dead-reckoning sensor 120 shown in FIG. 1. Alternatively, the location information module 125 receives location information mainly via the GPS receiving unit 110 and partially uses the dead-reckoning sensor 120 for an area where the GPS receiving unit 100 fails to operate. For clarity and convenience of the following description, the location information module 120 includes the GPS receiving unit 110 and the dead-reckoning sensor 120. In this case, as mentioned in the foregoing description, the dead-reckoning sensor 120 receives a signal from at least one selected from the group consisting of an angle sensor, a terrestrial magnetism sensor and a vehicle speed sensor and then computes a location of a vehicle based on the received signal. Currently, a mobile receiver extracts correction data to correct a location of a moving receiver through a hybrid location information module using GPS information and information obtained from various sensors of a vehicle and then corrects the location using the extracted correction data. Hence, the mobile receiver is able to obtain its current location. As mentioned in the foregoing description, the location information module 125 is able to use both of the information or can obtain the location information using the GPS information only if necessary.

The location information module 125 transmits the current location information to the control unit 101 within the main board. The control unit 101 extracts map information, GIS information and the like to match the location information received from the location information module 125 in the memory 102 within the main board. The control unit 101 displays a current location of the receiver on a map by matching the extracted information and the location information to each other and extracts cell information at the obtained current location of the receiver from the memory 102 again. The control unit 101 parses the cell information corresponding to current location of the receiver from the extracted cell information, transmits the parsed cell information to the controller 215 within the broadcast module. Hence, even if a channel for a currently viewed broadcast is changed, it is tuned to a corresponding channel using the transmitted channel information to provide a corresponding broadcast to a user.

In case that user input information inputted via the front board 152, e.g., a route search information request for a destination or a point of interesting (POI) is received, the location information module 125 receives location information on the destination or the POI based on current location information and then transfers the received information to the control unit 101 within the main board.

The control unit 101 within the main board receives information on a current location of the receiver and information on a route to a destination from the current location from the location information module 125, extracts map information and the like from the memory 102, and then matches the information to each other. Subsequently, the control unit 101 within the main board outputs cell information at each location according to the matching together with the current information on the receiver to the controller 215 within the broadcast module. The controller 215 within the broadcast module temporarily stores the received cell information at the location on each route in the memory 216, extracts the temporarily stored cell information according to the information, which is outputted from the control unit 101 within the main board, on the current location of the receiver, and is then automatically tuned. Hence, it is able to keep providing a broadcast even if a channel of a currently viewed broadcast is changed.

If the cell information is not provided to the memory and the like in advance, it can be used by being parsed from a transmitted broadcast signal or it can be requested to and received from a transmitting side to be used. For example, CIT shown in FIG. 6 can be used as the cell information transmitted by being contained in the broadcast signal.

The receiver can be automatically tuned using routing information according to a user input. If a user inputs information on a destination, the receiver searches moving routes to the destination from its current location using the location information module 125 and then displays the searched moving routes or an optimal route on a screen. In particular, the receiver generally searches all routes available for the destination from the current location and then guides a route for arriving at the destination within a shortest time. In some cases, the receiver is able to provide a user with an optimal route or a route that reflects a pay road thereon. The provided route is provided in a manner of being searched by the receiver itself or guiding an optimal route or a detour route that reflects traffic congestion information by receiving externally provided information, e.g., transportation information using the communication module 130 or the broadcast module 140. And, a route is automatically re-searched in the course of guiding in a manner of reflecting transportation information provided by real time if necessary. Moreover, the receiver is able to provide a traffic situation, accident information, emergency information and the like in addition to the guided route information.

The receiver receives TPEG (Transport Protocol Expert Group) information within a broadcast signal transmitted via the broadcast module 140, parses the received TPEG information, and then uses the parsed information for the route selection. For instance, if TPEG information is included in enhanced data and then transmitted by a transmitting side, a receiving side receives the enhanced data and then demodulates the received enhanced data. If the enhanced data is AV type, it is processed by the AV decoder 214 and then provided. If the enhanced data is a section type according to DSM-CC (Digital Storage Media-Command and Control), the TPEG information can be provided in a manner that the program table information decoder 217 corresponding to a data decoder decodes the enhanced data.

In particular, the main board 105 receives a destination from a user and obtains a current location of the receiver using location information data received from the location information module 125. The main board 105 searches all moving routes between the current location of the receiver and the destination. The main board 105 decides an optimal moving route by itself or selects an optimal route using transportation information received from the external server and the like. The main board 105 is then able to provide the optimal route to the user by matching it to map information. While the user is viewing a broadcast, cell information corresponding to the provided route is previously extracted. The receiver is then automatically tuned in a corresponding area. While the user is viewing the broadcast, the user stops viewing the broadcast for a predetermined time and then provided with CD (Compact Disc), DVD (Digital Versatile Disc), radio or a route guide. If the user inputs a broadcast view again, the broadcast is provided via the same channel on the same cell. If a location of the receiver is changed according to traveling, the receiver is automatically tuned by extracting information on a changed cell. Since the cell information according to the traveling is changed, if the information on the same channel does not exist, the receiver is tuned to a random channel or a preset channel to provide a broadcast to a user.

Figure 3:
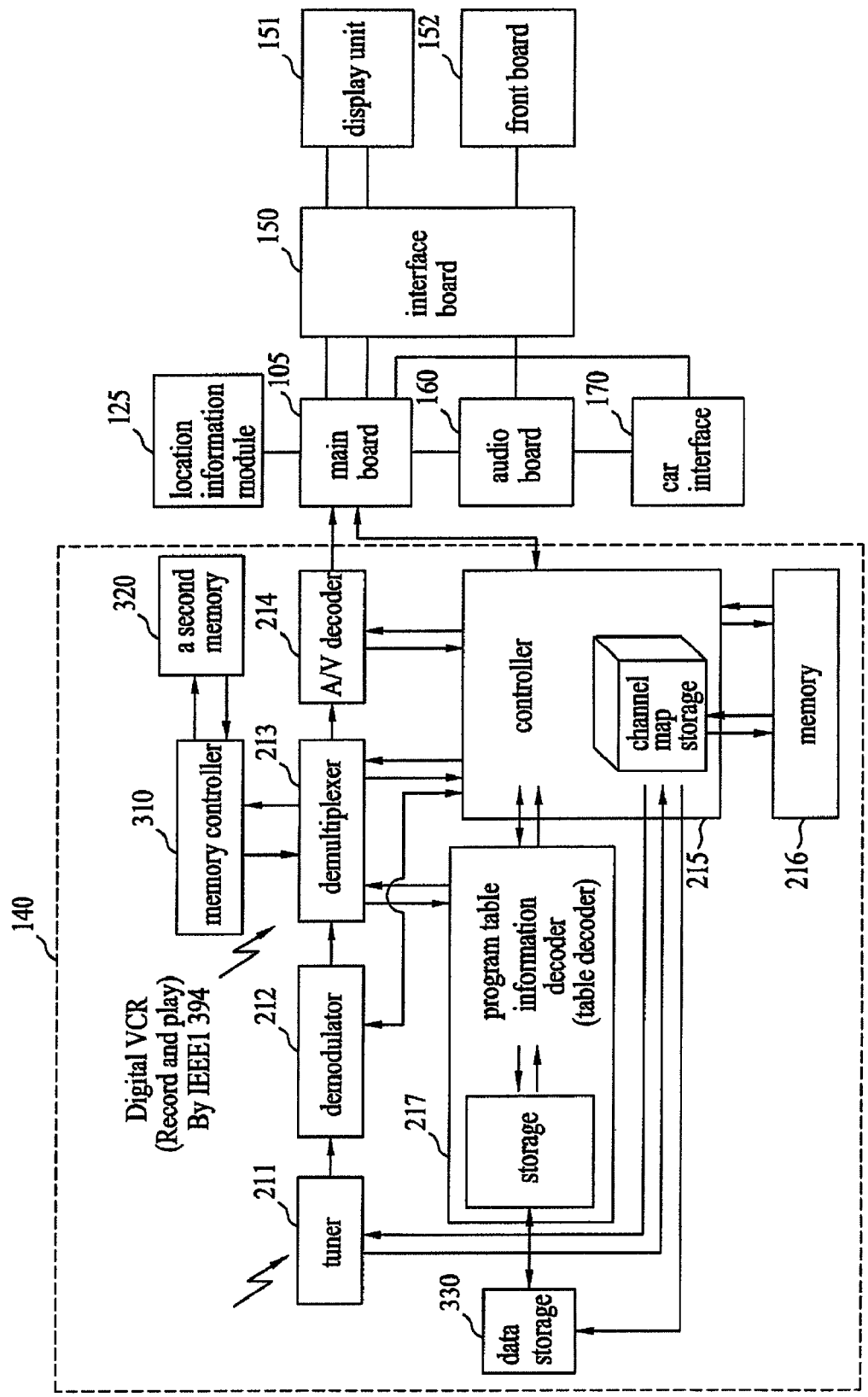
FIG. 3 is a block diagram of a receiver according to another embodiment of the present invention.

FIG. 3 is a block diagram of a receiver according to another embodiment of the present invention.

Referring to FIG. 3, a receiver according to another embodiment of the present invention further includes a second memory 320 storing programs therein and a memory controller 310 controlling the second memory 320 as well as the former memory 216 shown in FIG. 2. In this case, the second memory 320 can include a hard disc drive (HDD) and the like.

The demultiplexer 213 demultiplexes broadcast service data. The demultiplexed broadcast service data can be decoded and outputted by the decoder 214 or can be inputted to or read out of the second memory 320 by the memory controller 310 that controls the second memory 320. The demultiplexer 213 enables main service data demodulated by the demodulator 212 or mobile service data to be stored in the second memory 320.

The controller 215 enables instant recording, reserved recording and time-shift of the broadcast service data demultiplexed by the demultiplexer 213 via the memory controller 330. And, the controller 215 is able to play back the broadcast service data previously stored in the second memory 320 via the memory controller 330 and the demultiplexer 213.

The second memory 320 can be divided into a temporary storage area for storing data according to the time-shift and/or a permanent storage area for storing data permanently according to a recording selection.

The memory controller 310 is able to control play, fast forward, rewind, slow motion, instant replay and the like of the data stored in the second memory 320 according to a control signal of the controller 215. In this case, the 'instant replay' means a function of viewing an instant scene repeatedly. The 'instant replay' is interconnected to a time-shift function to instantly replay data currently received by real time as well as the stored data.

The memory controller 310 scrambles and stores inputted data to prevent data, which is inputted to and then stored in the second memory 320, from being illegally copied. And, the memory controller 310 can read, descramble and then store the scrambled data stored in the second memory 320.

In case that broadcast data for data broadcasting is contained in main service data or mobile service data, the program table information decoder 217 is able to decode the corresponding broadcast data. The data for the data broadcasting is decoded by the program table information decoder 217 and then stored in a data storage unit 330.

In case that the controller 215 drives a broadcast application according to a user request, the program table information decoder 217 decodes and outputs service information containing signalizing information.

The program table information decoder 217 is able to decode such service information a PSI/PSIP or DVB-SI. Broadcast data for data broadcasting may be a PES (Packetized Elementary Stream) type or a section type. In particular, the data for data broadcasting includes PES or section type data. For instance, service information is included in DSM-CC section and the DSM-CC section can include TS packets of 188-byte unit. Moreover, identifier of the TS packet included in the DSM-CC section is included in program table information that is DST (Data Service Table). In case of transmitting DST, a value of stream_type field within a service location descriptor of PMT (Program Map Table) or VCT (Virtual Channel Table) is set to '0x95'. If the value of the stream_type field of the PMT or VCT is set to '0x95', the receiver decides that service information is received.

The service information can be transmitted by data carousel. In order to process the service information, the demultiplexer 213 performs section filtering under the control of the program table information decoder 217, discards overlapped sections, and outputs non-overlapped sections to the program table information decoder 217.

The program table information decoder 217 is able to know whether data for a data broadcast is carried by a broadcast signal of the data broadcast according to PID (Packet IDentifier) of VCT. The PID of VCT is set in MGT or may have a fixed value.

The demultiplexer 213 is able to output AIT (Application Information Table only to the program table information decoder 217 via section filtering. The AIT contains information on an application driven in the receiver for a data service. The AIT can contain such information on an application as application name, application version, application priority, application ID, application state (e.g., auto start, user manipulation function, kill, etc.), application type (e.g., Java, HTML, etc.), application class, position of stream containing data file, application base directory, application icon position and the like. Hence, it is able to store information necessary to drive an application in the data storage unit 330.

Application driven by the controller 215 is received together with broadcast data and then updated. Data broadcast application manager executed to drive an application by the controller 215 can be provided with a platform to execute an application program. The platform includes Java virtual machine to execute Java application for example.

Assuming that a data broadcast service is a transportation information service, the receiver is able to provide the service to users via at least one selected from the group consisting of text, audio, graphic, still picture, moving picture and the like even if not provided with an electronic map or GPS.

If the receiver includes the GPS receiving unit 110, it is able to implement a data broadcast application after current location information (e.g., latitude, longitude, altitude, etc.) received from a satellite by the GPS receiving unit 110 has been extracted. The data storage unit 330 of the receiver can store an electronic map containing information on each link and node and various kinds of graphic information.

The controller 215 can include an interface board (unit) 150 receiving a control signal according to user input information from the main board 105. In particular, the controller 215 stores channel map information in which physical channel and virtual channel are mapped to each other to enable the tuner 211 to select a channel and controls the decoder 214 to display a broadcast according to a channel request made by a user. If the program table information decoder 217 parses the updated table information, the controller 215 controls the updated channel information to be stored in the channel map. For instance, after the receiver has moved between cells, if the channel information is updated, the updated channel information is stored in the channel map.

The controller 215 receives receiver's current location information received from the location information module 125 and cell information matching the location information from the main board 105 or stores other control information such as information on application in the memory 216.

In case that the cell information matching the receiver's current location information is not received from the main board 105, as mentioned in the foregoing description, the controller 215 receives CIT section containing cell information, parses the received CIT section, transmits the parsed CIT section to the main board 105, receives information matching the current location of the receiver within the cell information transmitted from the main board 105 again, and then stores the received information. For instance, if the receiver moves away into a cell (cell-B) from a cell (cell-A), in case that previously provided cell information does not exist in the main board 105, the controller 215 provides cell information by parsing CIT. The main board 105 selects information on the cell-B matching a current location of the receiver from the provided cell information and then transmits the selected information on the cell-B to the controller 215. If so, the controller 215 stores the corresponding information and uses for broadcast processing.

If the receiver is currently located in an overlapped area where a plurality of cell information is received, the main board 105 should transmit a control signal from controlling the controller 215 to enable a currently viewed broadcast to keep being provided.

In particular, the main board 105 selects one cell from the cell information matched according to the current receiver location information periodically and consecutively received, is tuned via the controller 215, and then transmits the control signal to provide a corresponding broadcast.

The process for the above case that the receiver is currently located in the overlapped area can be carried out in a manner that a broadcast is provided by maintaining a previous cell intact or in a manner that specific cell information is used by comparing strengths of received signals to each other. This will be explained in detail later.

The controller 215 is able to control the tuner 211, the demodulator 212, the demultiplexer 213, the decoder 214 and the like to keep providing a broadcast on a channel provided by being received from a cell prior to handover using channel information of a handed-over cell according to a control signal of the main board 105.

If the demodulator 212 extracts information for identifying a cell contained in signaling information, the controller 215 receives the extracted information and then decides whether it is handed over. If it is handed over, the program table information decoder 217 is able to parse CIT information using a cell identifier according to a signaling signal contained in a handed-over broadcast signal. The controller 215 is able to control the tuner 211, the demodulator 212, the demultiplexer 213, the decoder 214 and the like to enable a broadcast signal of a handed-over cell from the parsed information to be processed.

Figure 4:
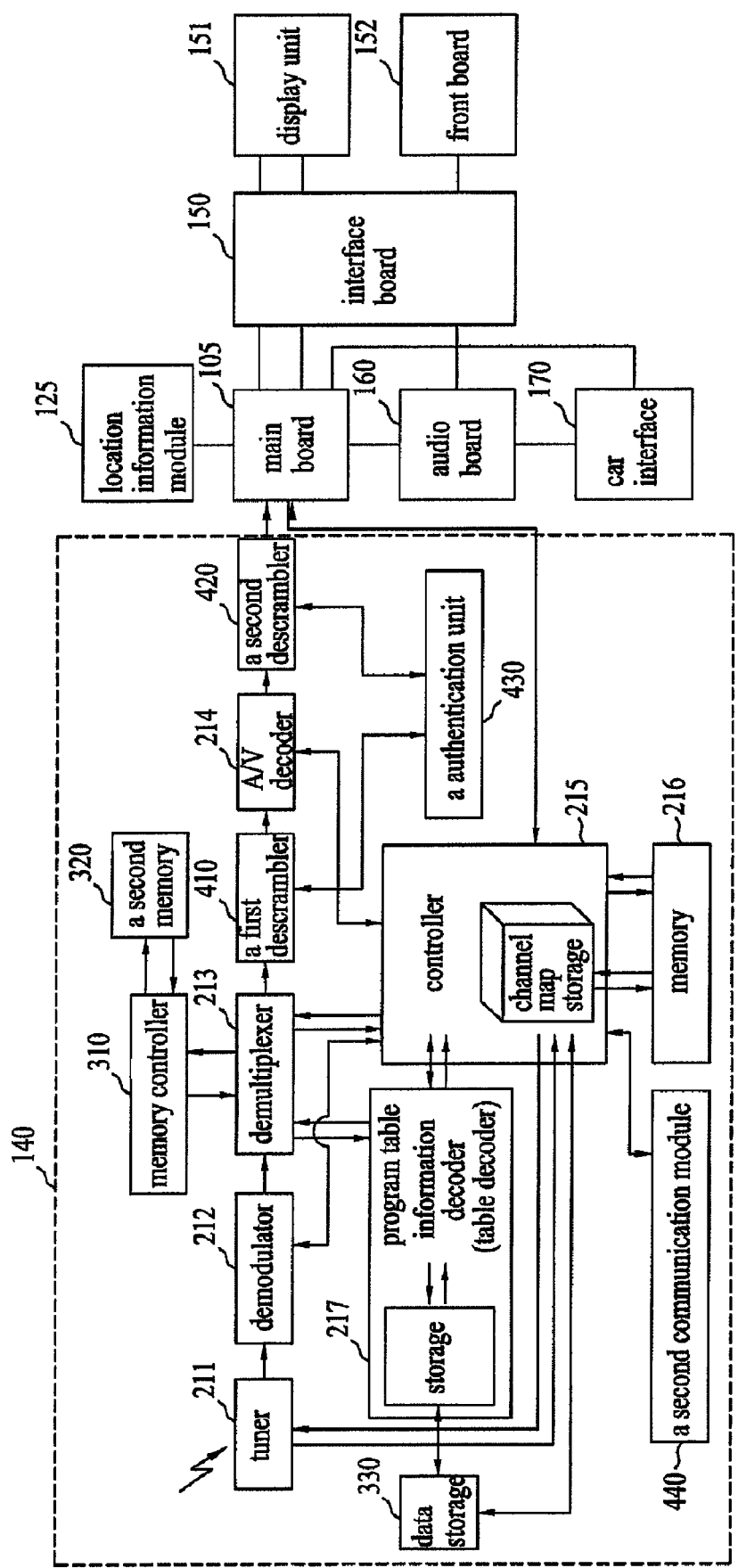
FIG. 4 is a block diagram of a receiver according to a further embodiment of the present invention.

FIG. 4 is a block diagram of a receiver according to a further embodiment of the present invention.

Referring to FIG. 4, a receiver according to a further embodiment of the present invention further includes a first descrambler 410, a second descrambler 420 and an authenticating unit 430 as well as the elements shown in FIG. 2. Alternatively, the receiver may further include either a first descrambler 410 or a second descrambler 420 as well as the elements shown in FIG. 2.

The first descrambler 410 receives a signal demultiplexed by a demultiplexer 213 and then descrambles the received signal. In doing so, the first descrambler 410 receives an authentication result from the authenticating unit 430 or data necessary for descrambling and then uses it for the descrambling.

A decoder 214 receives the signal descrambled by the first descrambler 410, decodes the received signal and then outputs the decoded signal. In case that the former embodiment shown in FIG. 3 does not include the first descrambler 410, the signal outputted by the decoder 214 can be descrambled by the second descrambler 420.

Transmitter is able to scramble and transmit broadcast contents to provide a service for preventing illegal copy or unauthorized viewing of main service data or mobile service data or a pay-view broadcast service. The receiver displays broadcast contents by descrambling the broadcast contents. Prior to the descrambling, an authentication procedure by an authenticating means can be executed. In the examples shown in FIG. 4, the first descrambler 410, the second descrambler 420 and the authenticating unit 430 can be detachably provided as a slot or a memory stick to the receiver.

If the broadcast contents having been scrambled is received via the tuner 211 and the demodulator 212, the controller 215 can decide whether the received broadcast content is scrambled or not. If the received broadcast content is scrambled, the authenticating unit 430 activates the authenticating means.

The authenticating unit 430 executes an authentication procedure to decide whether the receiver is an authorized host (receiver) capable of receiving a pay-view broadcast content received by the receiver. In this case, various kinds of authentication procedures are executable.

For instance, the authenticating unit 430 can carry out authentication in a manner of comparing an IP address of internet protocol (IP) datagram within a received broadcast content to an intrinsic address of a corresponding receiver. In this case, the intrinsic address of the receiver may include MAC (Media Access Control) address.

The authenticating unit 430 obtains information on a receiver mapped to a corresponding address by extracting IP address from decapsulated IP datagram. The authenticating unit 430 is provided with information (e.g., table format) for mapping the IP address and the information on receiver to each other in advance and then compares them to each other to decide whether they are identical to each other.

For another instance of the authentication, transmitting and receiving side define standardized identification information in advance, the transmitting side transmits identification information on a receiver having requested a pay-view broadcast service, the receiving side then executes an authentication procedure through decision of identity to its identification number.

The transmitting side creates a database and then stores intrinsic identification information of a receiver having requested a pay-view broadcast service in the database. In case of scrambling a broadcast content, the transmitting side transmits EMM (Entitlement Management Message) by having identification information included in the EMM. If the broadcast content is scrambled, a message (e.g., ECM (Entitlement Control Message), EMM) such as CAS (Conditional Access System) information applied to scrambling, mode information, message position information can be carried by a corresponding data header or another packet.

ECM can contain control word (CW) used for the scrambling. In this case, the control word may be encrypted using an authentication key. The EMM can contain an authentication key and entitlement information of the corresponding data. The authentication may be encrypted into a distribution key intrinsic to a recipient. If broadcast data is scrambled using the CW and if information for authentication and information for descrambling are transmitted by the transmitting side, the transmitting side encrypts the CW using the authentication key and then transmits the ECM by having the CW contained in the ECM.

The transmitting side has the EMM contain the authentication key used in encrypting the CW and reception entitlement (e.g., standardized serial number of receiver entitled to reception) of the receiver and then transmits the EMM.

Hence, the authenticating unit 430 of the receiver carries out the authentication procedure in a manner of extracting the identification information intrinsic to the corresponding device and the identification information contained in the EEM and then deciding a presence or non-presence of identity of the two identification information. As a result of the authentication execution, if the both of information is identical to each other, it is able to decide that the receiver is an authorized receiver having the reception entitlement.

For further instance of authentication, the receiver can include an authentication means provided to a detachable external module. In this case, the receiver and the external module interface with each other via a common interface (CI). The external module is able to execute descrambling by receiving scrambled data from the receiver via the CI and may transmit information necessary for the descrambling to the receiver only.

The CI includes a physical layer and at least one protocol layer. To consider future extensibility, the protocol layer can include at least one layer that provides an independent function.

The external module can include a memory or card storing key information used for scrambling and authentication information without a descrambling function or a card having the descrambling function. Namely, the module can include the descrambling function in hardware, middleware or software.

In this case, in order to provide a pay-view broadcast service to a user from the transmitting side, both of the receiver and the external module should be authenticated. Hence, the transmitting side may provide the pay-view broadcast service to the authenticated receiver and the authenticated module pair only.

Besides, the receiver and the external module can mutually authenticate each other via the CI. The external module can authenticate the receiver by communicating with the main board 220 or the controller 215 of the receiver via the CI.

The receiver can authenticate the module via the CI. And, the module extracts an intrinsic ID of the receiver and its intrinsic ID in the course of the mutual authentication and then transmits the extracted IDs to the transmitting side. The transmitting side then uses the values in deciding whether to start a corresponding service or as billing information. The controller 215 is able to the billing information to the transmitting side in a remote place via a communication module 440.

The authenticating unit 430 authenticates the receiver and/or the external module. If the authentication is successfully completed, the authenticating unit 430 authorizes that the receiver is an authorized receiver capable of receiving the pay-view broadcast service.

The authenticating unit 430 is able to authentication relevant data not from the transmitting side providing the broadcast content but from a mobile communication service provider for which a user of the receiver has been subscribed. In this case, the authentication relevant data is scrambled by the transmitting side providing the broadcast content and then transmitted via the mobile communication service provider. Alternatively, the authentication relevant data is scrambled and transmitted by the mobile communication service provider.

If the authentication procedure is successfully completed by the authenticating unit 430, the receiver is able to descramble the scrambled and received broadcast content. The descrambling is carried out by the descramblers 410 and 420. The descramblers 410 and 420 can be provided within the receiver or to the external module. The receiver is provided with the common interface (CI) and communicates with the external module including the descramblers 410 and 420, thereby descrambling the received signals.

If the descramblers 410 and 420 are provided within the receiver, the transmitting side (including at least one of a service provider and a broadcasting station) scrambles and transmits data by the same scrambling method. Meanwhile, if both of the scramblers 410 and 420 are provided to the external module, each transmitting side can scramble and transmit data by a different scrambling method.

The controller 215 can communicate with the descramblers 410 and 420 by a predetermined interface format. Common interface protocol between the receiver and the external module includes a function of periodically checking a state of a correspondent party to maintain normal communication in-between. Each of the receiver and the module manages the state of the correspondent party using this function. If one of the receiver and the module malfunctions, the function of reporting malfunction to a user or the transmitting side and attempting recovery.

For further instance of authentication, it is able to execute an authentication procedure in software without being dependent on hardware. In particular, if a memory card storing software in advance by download and the like is inserted, the receiver receives CAS software from the inserted memory card, loads the received CAS software, and then executes the authentication procedure.

The CAS software read from the memory card is stored in the memories 216 and 320 within the receiver and is driven in one application form on middleware (M/W) for example. In this case, the M/W includes JAVA middleware for example.

For this, the receiver can include a CI to access the memory card. In this case, the memory 216 includes one of a volatile memory, a non-volatile memory, a flash memory (e.g., flash ROM) and the like. The memory card mainly includes a flash memory or a small-scale hard disc. The memory card is usable for at least one receiver according to contents, authentication, scrambling, billing system and the like of the stored CAS software. Yet, the CAS software contains information mandatory for authentication and information mandatory for descrambling at least.

Hence, the authenticating unit 430 performs the authentication procedure between the transmitting side and the receiver or between a broadcast signal receiver and the memory card. In this case, the memory card can include information on a valid receiver authenticated as entitled to reception. For instance, the information on the receiver contains such intrinsic information as serial number standardized for the corresponding receiver. Hence, the authenticating unit 430 can perform the authentication between the memory card and the receiver by comparing the intrinsic information such as the standardized serial number contained in the memory card and the intrinsic information of the corresponding receiver to each other.

If the CAS software is driven based on Java middleware, it carries out the authentication between the receiver and the memory card. For instance, it is checked whether a receiver's intrinsic number contained in the CAS software and a receiver's intrinsic number read via the controller 215 of the receiver are identical to each other.

If the intrinsic numbers are identical to each other, the memory card is verified as a valid memory card available for the receiver. In this case, the CAS software can loaded in the memories 216 and 320 by a manufacturer of the receiver. Alternatively, the CAS software can be stored in the memories 216 and 320 from the transmitting side, the module or the memory card. The descrambling function is operable in one application form by a data broadcast application.

The CAS software obtains information (i.e., CW) necessary for descrambling by confirming whether the corresponding receiver has a reception entitlement in a manner of parsing EMM/ECM packet outputted by the demultiplexer 213 and then provides the obtained information to the descramblers 410 and 420. The CAS software operable based on Java middleware confirms a current reception entitlement of the receiver in a manner of reading an intrinsic number of the receiver from the receiver and then comparing it to a receiver's intrinsic number carried by the EMM.

If the reception entitlement of the receiver is confirmed, it is checked whether the receiver is entitled to receiving a corresponding broadcast service using broadcast service information carried by ECM and the reception entitlement to the corresponding broadcast service.

If the entitlement to the broadcast service reception is confirmed, the encrypted CW carried by the ECM is decrypted using an authentication key carried by the EMM and then outputted to the descramblers 410 and 420. The descramblers 410 and 420 descramble the broadcast serve using the CW.

Meanwhile, the CAS software stored in the memory card is extensible according to a pay service a broadcasting station will provide. The CAS software can include other supplementary information as well as information relevant to the authentication and the descrambling. The receiver is able to upgrade the CAS software stored in the memory card by downloading new CAS software from the transmitting side.

Each of the descramblers 410 can be included in the module in hardware or software form. In this case, scrambled and received data can be decoded after it has been descrambled by the corresponding module.

In case that the scrambled and received data is stored in the second memory 320, the scrambled data is descrambled and then stored. Alternatively, the scrambled data is stored intact and then descrambled for playback.

In case that the memory controller 310 is provided with scramble/descramble algorithm, the memory controller 310 scrambles the scrambled and received data again and then stores it in the second memory 320.

For another instance, a descrambled (conditional-access) broadcast content is transmitted via a broadcasting network and authentication for releasing the conditional access, descrambling relevant information and the like are transmitted and received via the communication module 440. Hence, bidirectional communication is enabled in the receiver.

In order for a transmitting side located in a remote place to recognize broadcast to be transmitted to and received from the transmitting side and the receiver transmitting the broadcast data, the receiver delivers such intrinsic information (ID) as serial number of the corresponding receiver, MAC address of the corresponding receiver and the like the communication module 440 within the transmitting side or is provided with the intrinsic information (ID) from the communication module 440 within the transmitting side.

The communication module 440 within the receiver is able to support a protocol necessary to perform bidirectional communication with the communication module 440 within the transmitting side in the receiver failing to support the bidirectional communication function. And, the receiver configures PDU (Protocol Data Unit) using TLV (Tag-Length-Value) coding scheme including data to transmit and intrinsic information (ID). Tag filed includes indexing of a corresponding PDU, length field includes a length of value field, and the value field includes real data to be transmitted and a receiver intrinsic number (ID).

In case that that receiver is equipped with Java platform, it is able to configure a platform that is activated after Java application of the transmitting side has been downloaded to the receiver via network. In this case, after PDU containing a tag field arbitrarily defined by the transmitting side has been downloaded to a storage medium and the like within the receiver, it is able to transmit the PDU to the communication module 440.

In this case, in transmission/reception via a wireless data network, the receiver including a CI can be provided with WAP or CDMA 1xEV-DO accessible via a mobile base station of CDMA (Code Division Multiple Access), GSM (Global System for Mobile communication) or the like, wireless LAN (Local Area Network), mobile Internet, WiBro or WiMax accessible via an access point or the like.

The controller 215 can include an interface unit receiving a control signal according to user input information from the main board 220. In particular, the controller 215 stores channel map information, in which physical and virtual channels are mapped to each other, to enable the tuner 211 to select a channel and controls the decoder 214 to display a broadcast according to a channel request made by a user. If the program table information decoder 580 parses updated table information, the controller 215 stores updated channel information in a channel map. For instance, as the receiver moves away into one cell from another cell, if the channel information is updated, the updated channel information is stored in the channel map.

The controller 215 receives receiver's current location information received from the location information module 302 and cell information matching the location information from the main board 220 or stores other control information such as information on application in the memory 216.

If the cell information matched according to the current location information of the receiver is not received from the main board 220, as mentioned in the foregoing description, the controller 215 parses CIT section containing the cell information, parses the CIT section, transmits the parsed CIT section to the main board 220, receives information matching a current location of the receiver among the transmitted cell information again, and then stores the received information. For instance, after the receiver has moved away into a cell (cell-B) from a cell (cell-A), if previously provided cell information does not exist in the main board 220, the controller 215 provides cell information by parsing CIT. The main board 220 selects information on the cell-B which matches the current location of the receiver from the provided cell information and then transmits the selected information to the controller 215. If so, the controller 215 stores the corresponding information and then uses it for broadcast processing.

If the receiver is currently located in an overlapped area in which a plurality of cell information is received, the main board 220 should transmit a control signal to control the controller 215 so that a currently viewed broadcast can keep being provided.

In particular, the main board 105 selects a prescribed cell from cell information matched according to current location information of the receiver, which keeps being received with a prescribed period, and should transmit a control signal to provide a broadcast by tuning through the controller 215.

In order to process a case that the receiver is currently located in the overlapped area, a previous cell is maintained intact and provided or specific cell information is controlled to be used by comparing strengths of received signals to each other. Its details are explained later.

The controller 215 is able to control the tuner 211, the demodulator 212, the demultiplexer 213, the decoder 214 and the like to keep providing a broadcast on a channel received and provided by being received from a cell prior to handover in accordance with the control signal of the main board 105 using channel information on a handed-over cell.

If the demodulator 212 extracts information for identifying a cell contained in signaling information, the controller 215 receives the extracted information and then decides whether it is handed over. If it is handed over, the program table information decoder 217 is able to parse CIT information using a cell identifier according to a signaling signal contained in a handed-over broadcast signal. The controller 215 is able to control the tuner 211, the demodulator 212, the demultiplexer 213, the decoder 214 and the like to enable a broadcast signal of a handed-over cell from the parsed information to be processed.

Figure 5:
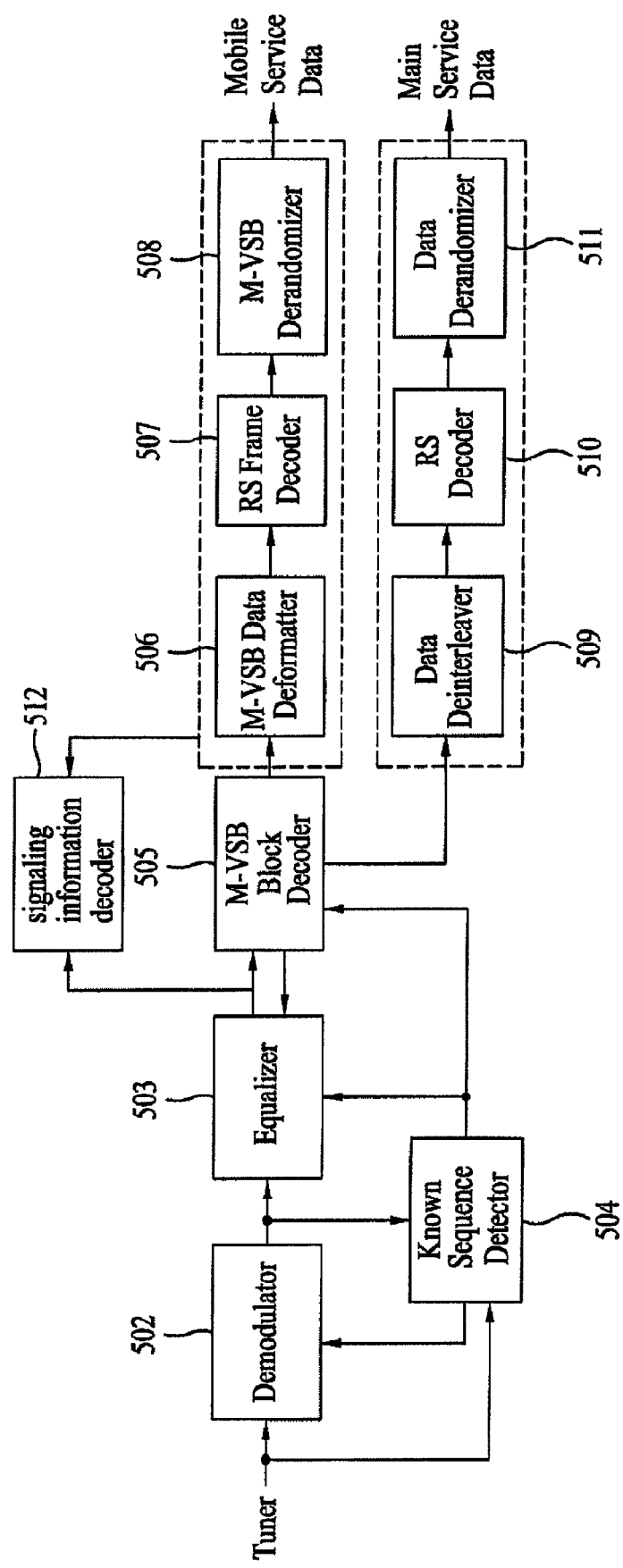
FIG. 5 is a block diagram of a demodulating unit for demodulating M-VSB modulated broadcast signal in the receiver shown in one of FIGS. 2 to 4 according to one embodiment of the present invention.

FIG. 5 is a block diagram of a demodulating unit for demodulating M-VSB modulated broadcast signal in the receiver shown in one of FIGS. 2 to 4 according to one embodiment of the present invention. FIG. 5 shows a structure to demodulate a broadcast signal in case that a transmitting side modulates the broadcast signal M-VSB to transmit. The demodulator 212 according to one embodiment of the present invention is explained as follows.

The broadcasting signal receiver restores a carrier sync signal, restores a frame sync signal and performs channel equalization using the known data information inserted in the mobile service data period in a transmission system, thereby improving reception capability.

The broadcasting signal receiver includes a (VSB) demodulator 502, an equalizer 503, a known sequence detector 504, an M-VSB block decoder 505, an M-VSB data deformatter 506, a RS frame decoder 507, an M-VSB derandomizer 508, a data deinterleaver 509, a RS decoder 510, a data derandomizer 511, and a signaling information decoder 512. In FIG. 5, for convenience of description, the M-VSB data deformatter 506, the RS frame decoder 507, and the M-VSB derandomizer 508 are collectively called a mobile service data processor and the data deinterleaver 509, the RS decoder 510 and the data derandomizer 511 are collectively called a main service data processor.

The demodulator 502 and the known sequence detector 504 receive the signal of which the frequency is tuned by the tuner and is down-converted into an intermediate frequency (IF).

The demodulator 502 performs the automatic gain control, the recovery of a carrier and the restoration of timing in consideration of the VSB method so as to convert the received IF signal to a baseband signal, and outputs the baseband signal to the equalizer 503 and the known sequence detector 504.

The equalizer 503 compensates for the distortion on the channel included in the demodulated signal and outputs the compensated signal to the M-VSB block decoder 505.

At this time, the known sequence detector 504 detects the location of known data inserted at the transmitter side from the input/output data of the demodulator 502, that is, the data before the VSB demodulation or the data after the demodulation. The known sequence detector 504 outputs the location information and the symbol sequence of the known data generated at the location to the demodulator 502 and the equalizer 503. The known sequence detector 504 outputs information for allowing the M-VSB block decoder 505 to distinguish the mobile service data, which is subjected to the additional error correction encoding at the transmitter side, and the main service data, which is not subjected to the additional error correction encoding, to the M-VSB block decoder 505. Although the connection state is not shown in FIG. 5, the information detected by the known sequence detector 504 can be used in the receiver and can be used in the M-VSB data deformatter 506 and the RS frame decoder 507.

The demodulator 502 can improve demodulation capability using the known data symbol sequence at the time of the restoration of the timing or the recovery of the carrier and the equalizer 503 can improve equalization capability using the known data. The decoded result of the M-VSB block decoder 505 may be fed back to the equalizer 503 so as to improve the equalization capability.

If the data received from the equalizer 503 is the mobile service data which is subjected to the additional error correction encoding and the trellis encoding at the transmitter side, the M-VSB block decoder 505 performs trellis decoding and additional error correction decoding as the inverse processes of the transmitter side. If the data is the main service data which is not subjected to the additional encoding and is subjected to the trellis encoding at the transmitter side, only the trellis decoding is performed.

The data group decoded by the M-VSB block decoder 505 is input to the M-VSB data deformatter 506 and the main service data packet is input to the data deinterleaver 509.

If the received data is the main service data, the M-VSB block decoder 505 may perform viterbi decoding with respect to the received data and output a hard decision value or a soft decision value.

If the received data is the mobile service data, the M-VSB block decoder 505 outputs the hard decision value or the soft decision value with respect to the received mobile service data. If the received data is the mobile service data, the M-VSB block decoder 505 decodes the data which is encoded by the M-VSB block processor and the trellis encoder of the transmission system. In this case, the RS frame encoder of the M-VSB preprocessor of the transmitter side may become an outer code and the M-VSB block processor and the trellis encoder may become an inner code. The decoder of the inner code may output the soft decision value such that the capability of the outer code can be maximized at the time of the decoding of the concatenated code.

Accordingly, the M-VSB block decoder 505 may output the hard decision value with respect to the mobile service data and preferably may output the soft decision value if necessary.

The data deinterleaver 509, the RS decoder 510 and the derandomizer 511 receive and process the main service data. The data deinterleaver 509 deinterleaves the main service data output from the M-VSB block decoder 505 as the inverse process of the data interleaver of the transmitter side and outputs the deinterleaved data to the RS decoder 510.

The RS decoder 510 performs systematic RS decoding with respect to the deinterleaved data and outputs the decoded data to the derandomizer 511. The derandomizer 511 receives the output of the RS decoder 510, generates the same pseudo random byte as the randomizer of the transmitter, performs a bitwise exclusive OR (XOR) with respect to the pseudo random byte, inserts the MPEG sync data in front of every packet, and outputs 188-byte main service data in the packet units.

The data output from the M-VSB block decoder 505 to the M-VSB data deformatter 506 has a data group form. At this time, since the M-VSB data deformatter 506 already knows the configuration of the received data group, it is possible to distinguish the mobile service data and the signaling information having the system information within the data group. The signaling information indicates information for delivering the system information and can deliver the information on the transmission parameter including the identifier of the cell.

The mobile service data is output to the RS frame decoder 507 and the M-VSB data deformatter 506 removes the known data inserted into the data group and the main service data, the trellis initialization data, the MPEG header and the RS parity added in the RS encoder/non-systematic RS encoder or the non-systematic RS encoder of the transmission system and outputs the mobile service data to the RS frame decoder 507.

That is, the RS frame decoder 507 receives only the mobile service data which is subjected to the RS encoding and/or CRC-encoding, from the M-VSB data deformatter 506.

The RS frame decoder 507 performs the inverse process of the RS frame encoder of the transmission system, corrects errors in the RS frame, adds a 1-byte MPEG sync signal which is removed in the RS frame encoding process to the error-corrected mobile service data packet, and the added mobile service data to the M-VSB derandomizer 508.

The M-VSB derandomizer 508 performs the derandomizing process corresponding to the inverse process of the M-VSB randomizer of the transmission system with respect to the received mobile service data and outputs the derandomized data, thereby obtaining the mobile service data transmitted from the transmission system.

The signaling information decoder 512 may decode the signaling information included in the received signal. FIG. 5 shows an example of decoding the signaling information including the identifier of the cell from the M-VSB data deformatter 506 or the equalizer 503 according to the location of the signal carried in the signaling information.

FIG. 6 is CIT section syntax containing information on a cell according to one embodiment of the present invention. As mentioned in the foregoing description, this is to obtain cell information of each cell matching map information stored in the memory 102 within the receiver from a transmitted broadcast signal if the cell information is not provided in advance. CIT containing cell information of each cell can be defined by negotiation between transmitting and receiving sides. For instance, CIT can be transmitted and received by the same formats of PSI/PSIP (program specific information/program and system information protocol) table.

The CIT section syntax structure is explained as follows. For clarity, in the following description, names of fields configuring the syntax are represented in a bold style. And, the CIT section syntax includes a heard, a body and a trailer like the general PSI/PSIP tables, which are explained in order as follows.

In the example of FIG. 6, the identifier (table_id) of the CIT is defined by 0xCE. In addition, "section_syntax_indicator", "private_indicator", "reserved", "section_length", "transport_stream_id", "reserved", "version_number", "current_next_indicator", "section_number", "last_section_number", and "protocol_version" fields may be defined similar to those defined in the MPEG-2 header.

In the following description, fields of the body of the CIT section are explained. 'num_cells_in_section' indicates information about the number o cells defined in CIT and may match the number of transmitters.

A "cell_id" field is the identifier of the cell according to the signal transmission area of each transmitter and may be matched with the transmitter of each broadcasting station. A "cell_text" field defines the name of each transmitter. For example, "transmitter of Mt. Yongmoon" may be set. A "cell_location" field defines the area in which each transmitter is located. For example, "Mt. Yongmoon" may be set.

A "num_channels_in_cell" field defines the number of broadcasting channels transmitted by each transmitter. A "num_channels_in_cell" field may be the total number of virtual channels in the physical channel transmitted by each transmitter. The CIT may include information on "major_channel_number", "minor_channel_number", "modulation mode" (for example, QAM, VSB, etc.), "carrier_frequency", "program number", and "reserved" fields.

Finally, the trailer includes a code for error correction. In the above description, the configuration of the receiver according to the present invention is explained.

Figure 7:
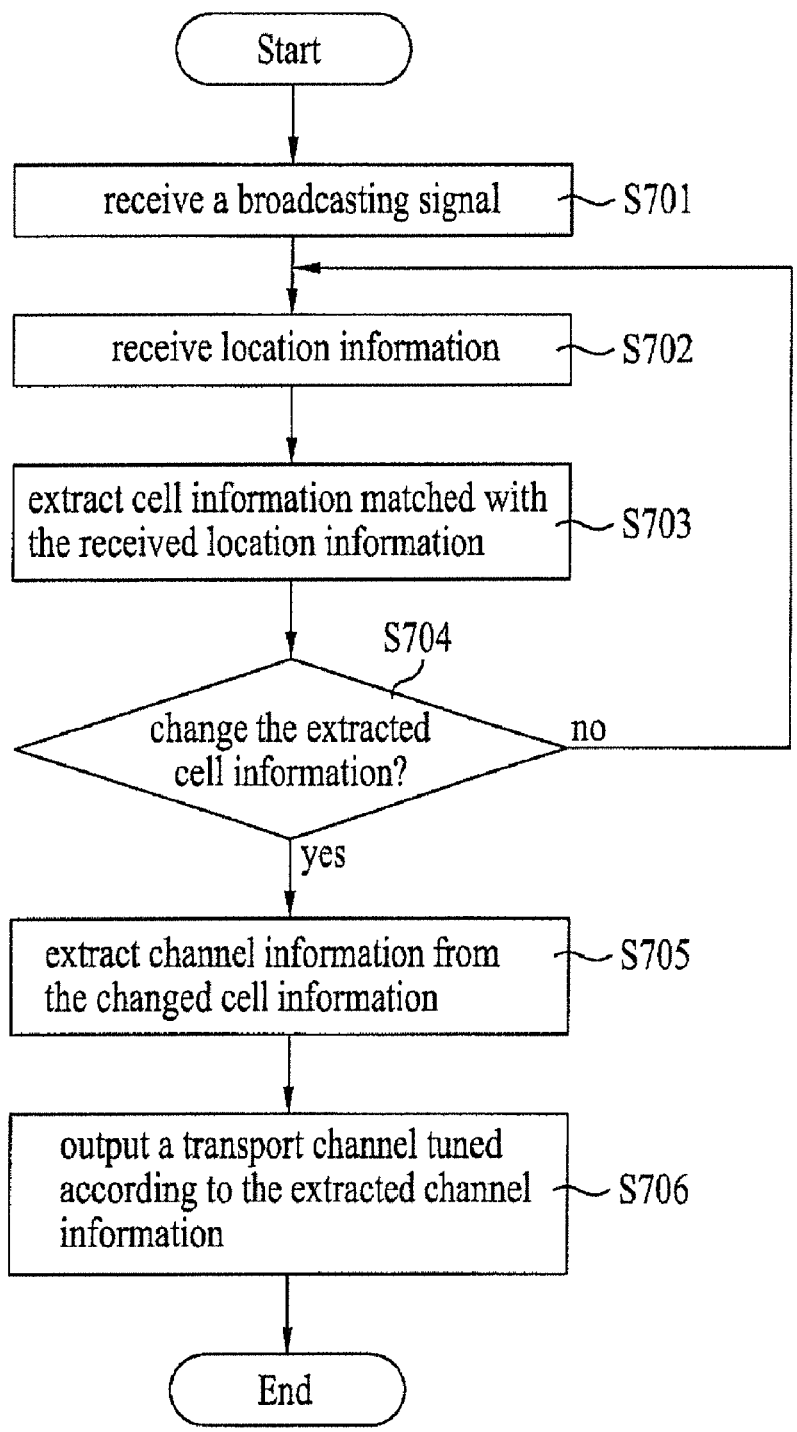
FIG. 7 is a flowchart for a receiving method according to one embodiment of the present invention.

In the following description, a process for processing a broadcast signal in the receiver is explained. A receiving method according to one embodiment of the present invention is explained as follows. FIG. 7 is a flowchart for a receiving method according to one embodiment of the present invention. Assume that cell information matching location information is provided within a memory of the receiver. As mentioned in the foregoing description, the cell information includes at least one selected from the group consisting of information for identifying a cell and information about a transport channel in a corresponding cell.

First of all, a broadcast module of a receiver receives a broadcast signal [S701]. Location information module receives current location information of the receiver and then outputs the received information to a controller within a main board [S702]. In this case, the location information keeps being received from a GPS receiving unit or a dead-reckoning sensor with a prescribed period (e.g., 0.5-sec unit). The controller extracts map data and cell information according to the received location information [S703] and then checks whether the extracted cell information has been changed [S704].

As a result of the check, if the cell information is changed, information on a transport channel is extracted from the changed cell information [S705], it is tuned to a channel for a currently provided broadcast, and the corresponding broadcast then keeps being provided [S706]. Besides, in case that broadcast information is changed in the tuned channel, the changed broadcast information should be received to be used in providing the broadcast. As a result of the check, if the cell information is not changed, the broadcast module just maintains the previous broadcast.

The cell information can contain information on a cell neighbor to a current cell. In this case, as mentioned in the foregoing description, the receiver can be automatically tuned to a channel for a cell, into which the receiver is going to move away, in advance according to a moving route of the receiver. And, it is able to obtain the cell information by parsing from a broadcast signal transmitted by a transmitting side.

Figure 8:
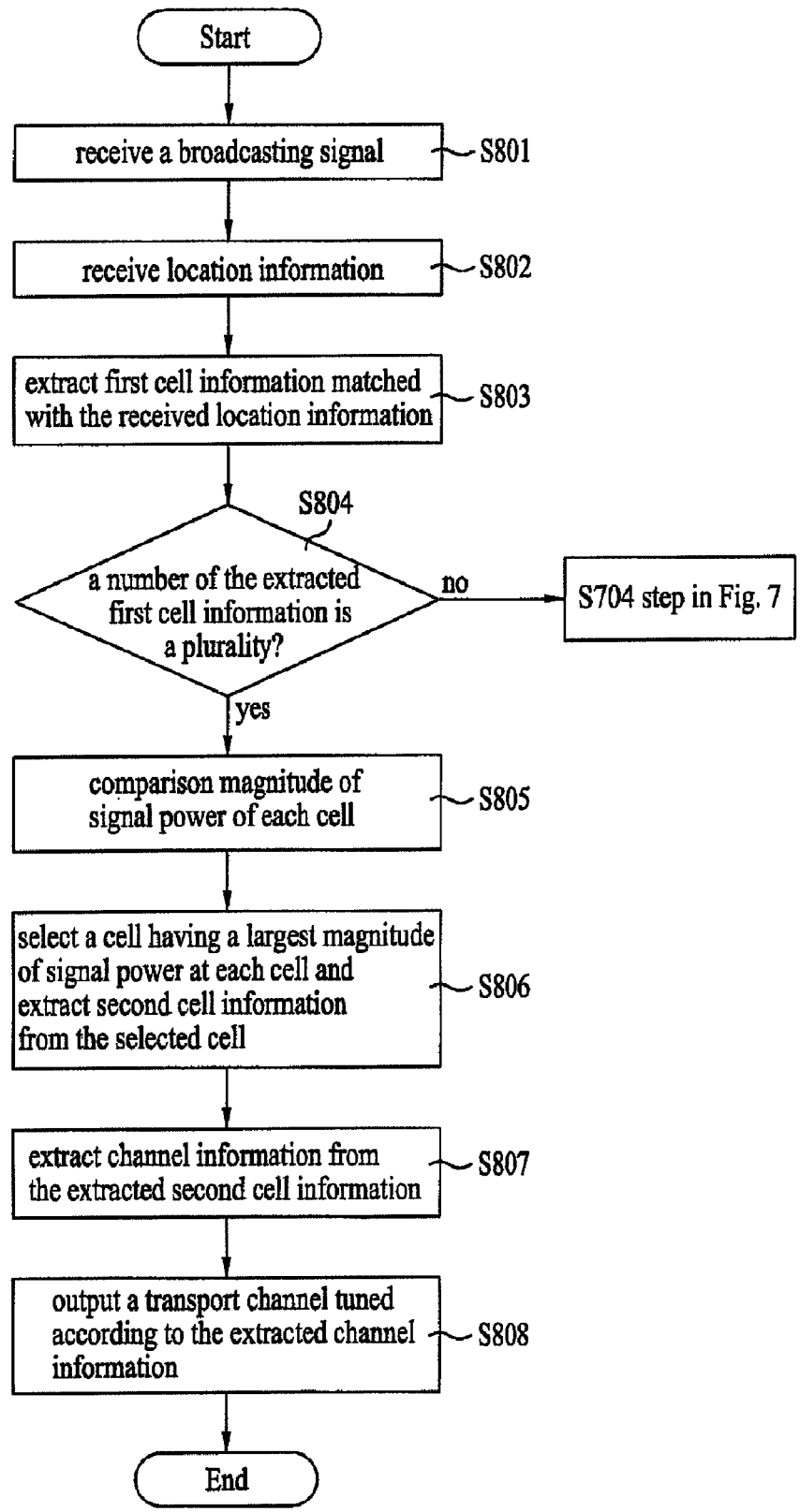
FIG. 8 is a flowchart for a receiving method according to another embodiment of the present invention.

FIG. 8 is a flowchart for a receiving method according to another embodiment of the present invention. In FIG. 8, assume that a receiver receives at least two of cell information at a corresponding location.

When a receiver is moving, discrimination of cell may not be clear. In particular, when a receiver moves away into a neighbor cell (cell-B) from a current cell (cell-A), a broadcasting range of each cell may not be accurately discriminated. Occasionally, there can be existed an overlapped area where broadcast signals are received from a plurality of cells.

FIG. 8 shows a receiving method in the overlapped area according to one embodiment of the present invention. A broadcast receiving method in each of the cells, e.g., in an area where cell-A and cell-B are overlapped with each other is explained as follows. In this case, assume that a receiver is provided with information for identifying a current cell (cell-A) and a neighbor cell (cell-B) and information on a transport channel in each cell (cell-A or cell-B) in advance. A basic broadcast providing process is similar to that shown in FIG. 7.

First of all, a broadcast module of a receiver receives a broadcast signal [S801]. Location information module receives current location information of the receiver and then outputs the received information to a controller within a main board [S802]. In this case, as mentioned in the foregoing description, the location information keeps being received from a GPS receiving unit or a dead-reckoning sensor with a prescribed period (e.g., 0.5-second unit). The controller extracts map data and cell information according to the received location information [S803] and then decides whether a plurality of cell information is extracted or not [S804].

As a result of the decision, if a plurality of cell information is extracted, the receiver decides that it is located in the overlapped area and then compares strengths of signals received from the respective cells [S805]. The receiver selects a cell having largest signal strength (or power) as a result of the comparison [S806] and then selects cell information of the selected cell. By extracting channel information of the extracted cell information [S807], the receiver provides a broadcast according to the extracted channel information [S808].

Having provided the broadcast, the receiver goes back to the step S805 and then keeps comparing strengths of received signals. If a strength of a received signal in one cell (cell-B) becomes greater than that of a signal received in a previous cell (cell-A), the receiver keeps providing a previous broadcast to a user by tuning according to channel information in the corresponding cell (cell-B).

In case that strengths of signal received from the respective cells are compared by repeating the above process, while the receiver is moving away into cell-B from cell-A, when the receiver is firstly located in the overlapped area, the strength of the broadcast signal in the cell-A is still greater than the other. Hence, the receiver will provide a corresponding broadcast by tuning according to the channel information in the cell-A. Yet, if the receiver keeps moving, the strength of the broadcast signal in the cell-B will grow. At a specific moment, the broadcast signal in the cell-B will dominate that in the cell-A.

In this case, the receiver can keep providing the previous broadcast to a user by tuning according to the channel information in the cell-B.

The above process continues until the receiver moves away from the overlapped area. Whether the receiver moves away from the overlapped area can be decided using location information of the receiver and cell information matching the location information.

On the contrary, as a result of the decision, if a plurality of cell information is not extracted, steps after the step S704 in FIG. 7 can be executed. In particular, even if there is existed single cell information, a change may take place due to inter-cell moving. Hence, this should be confirmed through the steps after the step S704.

Figure 9:
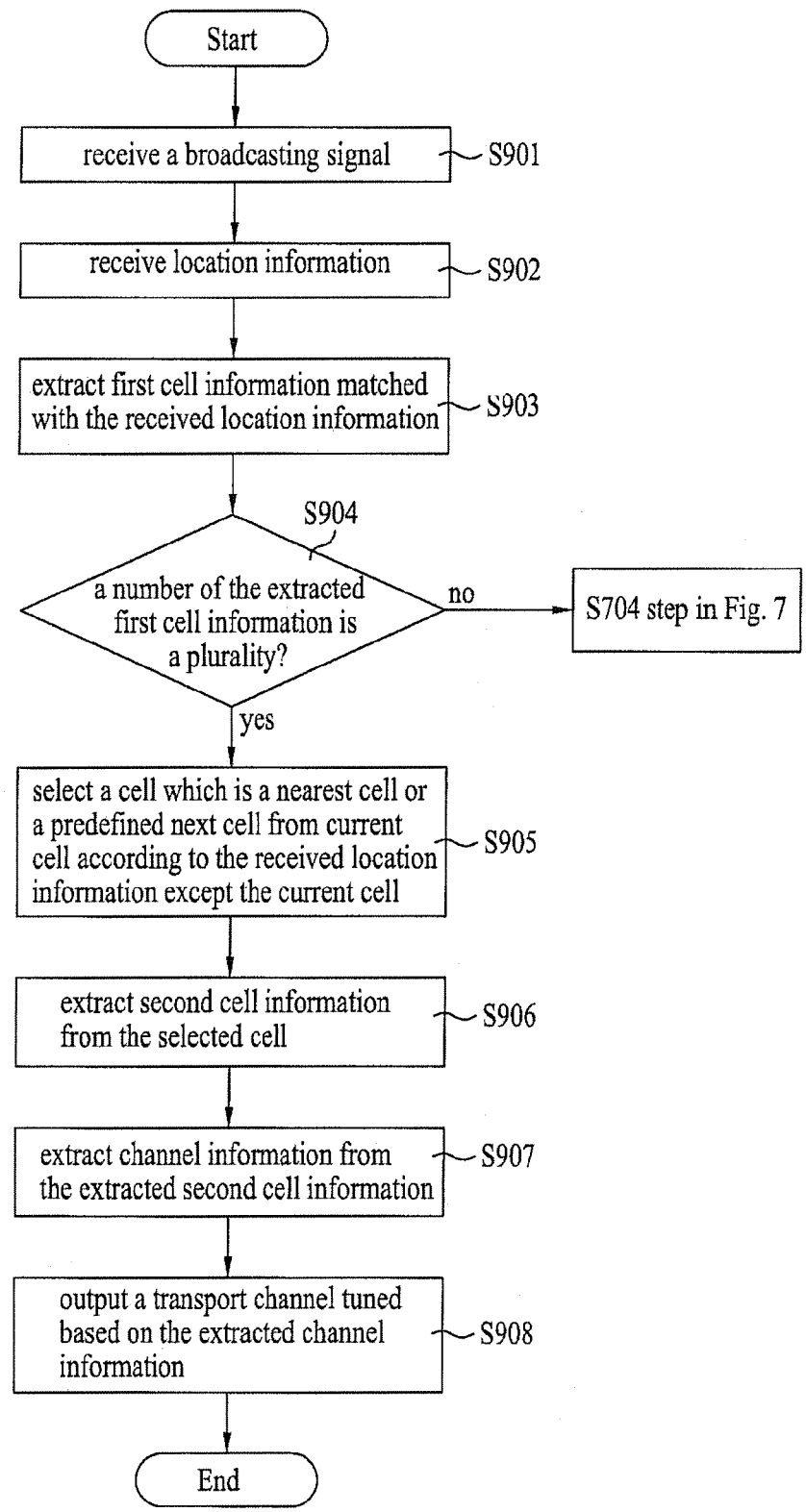
FIG. 9 is a flowchart for a receiving method in an overlapped area according to a further embodiment of the present invention.

FIG. 9 is a flowchart for a receiving method in an overlapped area according to a further embodiment of the present invention. In tuning a receiver to a channel by selecting a specific cell from a plurality of cells in the overlapped area shown in FIG. 8, if strengths of signals respectively received from the cells are determined, FIG. 9 shows a different method. In this case, a basic broadcast providing process is similar to that shown in FIG. 7.

First of all, a broadcast module of a receiver receives a broadcast signal [S901]. Location information module receives current location information of the receiver and then outputs the received information to a controller within a main board [S902]. In this case, as mentioned in the foregoing description, the location information keeps being received from a GPS receiving unit or a dead-reckoning sensor with a prescribed period (e.g., 0.5-second unit). The controller extracts map data and cell information according to the received location information [S903] and then decides whether a plurality of cell information is extracted or not [S904].

As a result of the decision, if a plurality of cell information is extracted, a cell nearest to a current location or a cell into which the receiver will move away is selected except a previous cell (cell-A) [S905]. Cell information of the selected cell is then extracted [S906]. Channel information of the extracted cell information is extracted [S907]. By tuning the receiver using the extracted channel information, a currently viewed broadcast keeps being seamlessly provided [S908]. Yet, as a result of the decision, if a plurality of cell information is not extracted, as mentioned in the foregoing description, steps after the step S704 shown in FIG. 7 can be executed. As a result of the decision, even if a plurality of cell information is extracted, the controller keeps providing the broadcast using information on the previous cell (cell-A) but may keep checking whether cell information not on the previous cell (cell-A) but on a different cell (cell-B) is received or not. As a result of the check, if the information on the different cell (cell-B) is received only, the controller is able to keep providing a currently viewed broadcast to a user by tuning in a manner of extracting the information on the corresponding cell (cell-B) and then extracting channel information of the extracted cell information. Alternatively, in selecting at least one different cell except the previous cell (cell-A), it is able to make a selection from a timing point at which a strength of a received signal in a different cell is equal to or greater than a threshold.

According to the present invention, a mobile receiver capable of knowing information on its location despite its inter-cell moving is able to seamlessly keep providing a currently viewed broadcast by extracting cell information of a cell, in to which the mobile receiver has moved away, according to the location information even if a separate selection or operation is not made by a user.

FIG. 10 is a flowchart for a receiving method using routing information according to one embodiment of the present invention.

Referring to FIG. 10, a user inputs a destination, to which a receiver is going to move, to the receiver [S1001]. If the destination is inputted, the receiver performs routing to the destination [S1002]. After completion of the routing, the receiver receives a broadcast signal [S1003] and then receives information on a current location of the receiver [S1004].

Cell information is extracted using the received current location of the receiver and routing information received as a result of the routing [S1005]. The receiver seamlessly keeps providing a broadcast previously viewed in a previous cell prior to moving by automatic tuning using the extracted cell information even if a cell is changed [S1006].

Figure 11A:
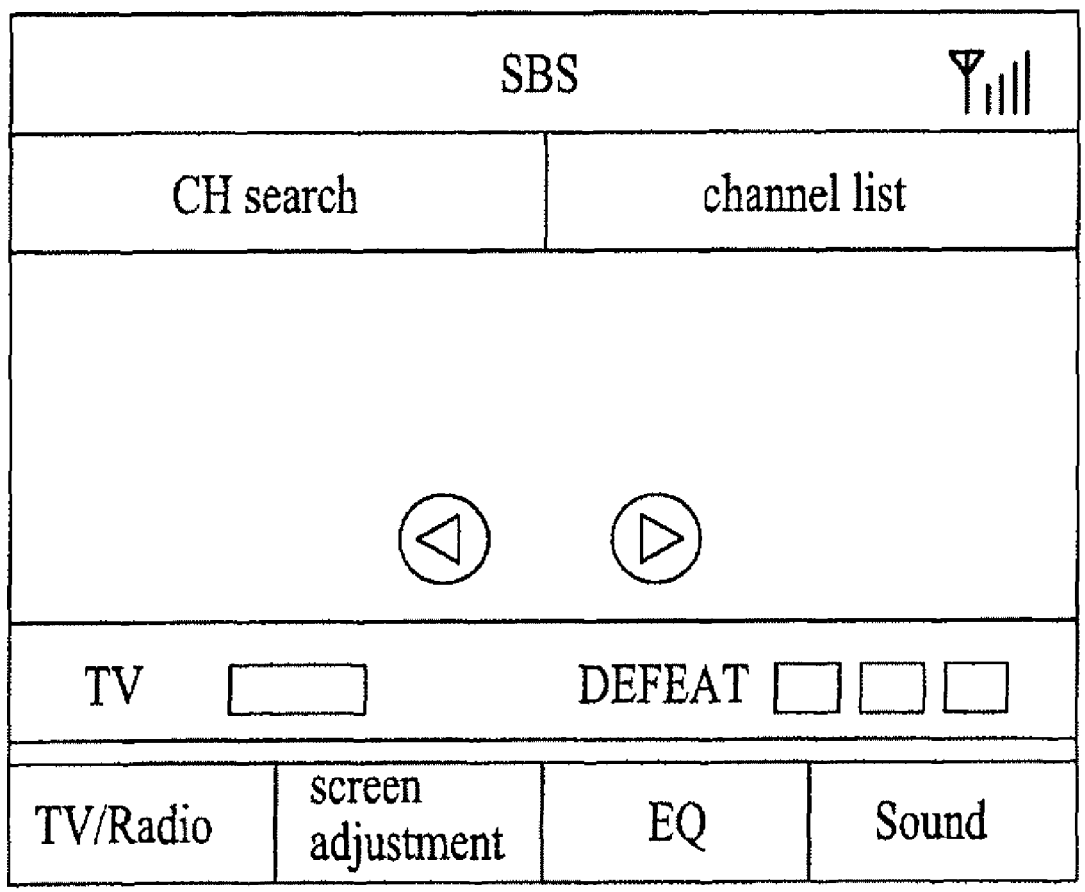
FIGS. 11A to 11C are diagrams of examples for UI according to the present invention.
Figure 11B:
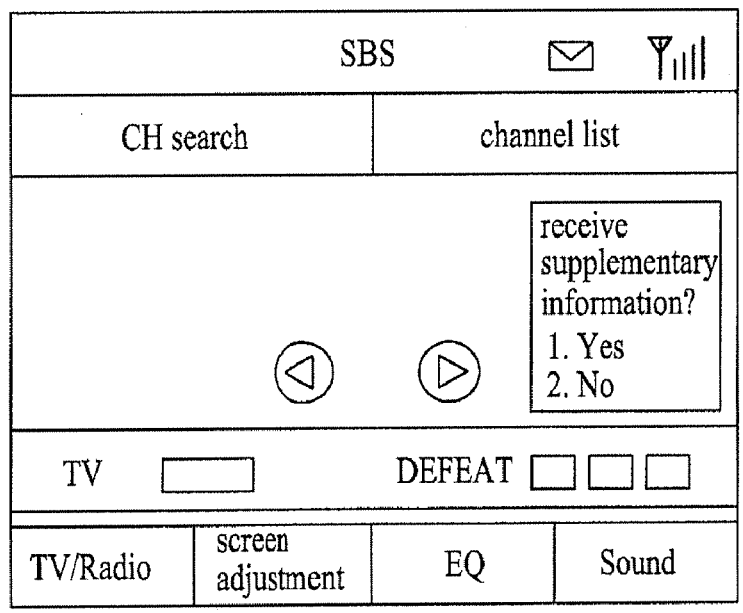
Figure 11C:
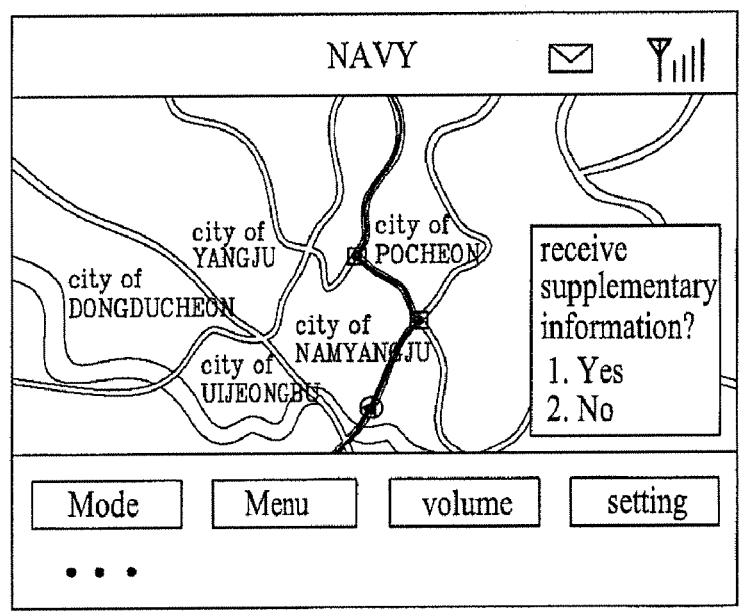

FIGS. 11A to 11C are diagrams of examples for UI (user interface) according to the present invention.

Referring to FIG. 11A, the UI is configured to be provided to a user via a screen if a user turn on a broadcast module of a receiver to view a broadcast. In this case, a list of channels selectable at a current location of the receiver can be displayed as a CH (channel) list.

The channel list can be a channel list about a specific cell or can provide a list of all channels received at a current location of the receiver due to broadcast characteristics instead of a specific cell. By displaying strengths of received channels of all channels are displayed together on the provided channel list. A user may not select a channel on which a broadcast is not normally provided due to a weak received signal. Moreover, a channel having received signal strength smaller than a predetermined level may not be provided at all.

In CI search, in case of UI to search for a specific channel specified by a user or in case that a receiver receives routing information in a manner that a user inputs a destination, it is able to confirm a list of channels that can be provided in advance by a cell to which the receiver will mode using the routing information. In particular, broadcast programs provided by cells may differ from each other. So, when a receiver user enters a corresponding cell by the above confirmation, if a specific broadcast is set to be viewed, the receiver is automatically tuned to provide a corresponding broadcast according to the above setting. In case that a broadcast is provided by automatic tuning according to the cell change, a corresponding CH list is automatically modified and then provided to a user.

Referring to FIG. 11B, while a user is viewing a current broadcast, if a broadcast signal is transmitted together with supplementary information containing separate transportation information or other pay information, it is able to display that the supplementary information is being received via the UI. By displaying an icon about the supplementary information and the like to a user, it is able to query whether to display the supplementary information or it is able to make the supplementary information reflected on a displayed image according to a selection made by a user. For instance, while a user is viewing a current broadcast, if transportation information is received, the receiver displays that the transportation information is being received through such a UI as an icon about the transportation information. If the transportation information reception is completed, the receiver queries whether to display the completion of the transportation information reception to a user. As a result of the query, if the user attempts to view the transportation information, the receiver just provides the transportation information.

This corresponds to other cases as well as a case that a user is viewing a broadcast. For instance, assume that a navigation function is active in a receiver as shown in FIG. 11C. In this case, if supplementary information such as transportation information or other pay information is received, the receiver is able to inform a user that the supplementary information is being received through the UI. If the reception of the supplementary information is completed, the receiver queries the user whether to display the supplementary information. For instance, if the supplementary information is the transportation information, the receiver queries the user whether to display the transportation information or reconfigure a currently activated image by reflecting the transportation information in the image. The receiver then implements and displays the corresponding function according to a selection made by the user.

If separate supplementary information, as shown in FIG. 11B or FIG. 11C, is received, it is able to put a special mark on a screen of the receiver. It may be able to configure an image in a manner of overlapping the supplementary information with a displayed image or enabling the supplementary information to be separately accessed via a portion except the image. As mentioned in the foregoing description, it is able to configure various UIs relevant to the present invention as well as the above-described examples.

Figure 12:
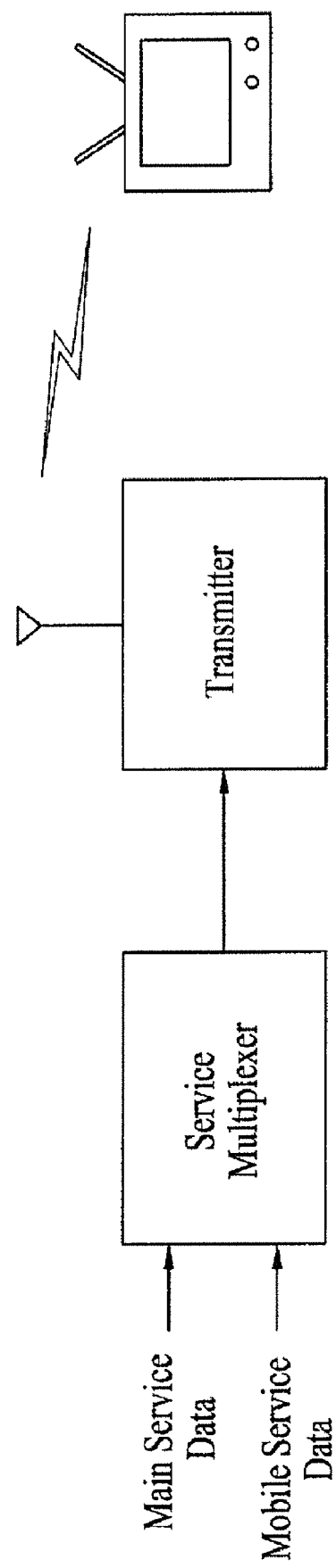
FIG. 12 is a block diagram of a broadcast system exemplarily configured in association with the present invention.

In order to easily describe the present invention, for example, an ASTC broadcasting system suitable for the MFN (multi-frequency network) environment will be described, but the present invention is not limited thereto. FIG. 12 is a block diagram of a broadcast system exemplarily configured in association with the present invention.

In the ATSC broadcasting system, a device for transmitting a broadcasting signal includes a service multiplexer and a transmitter.

Here, the service multiplexer may be located at a studio of each broadcasting station and the transmitter may be located at one or more specific sites. A plurality of transmitters may share the same frequency. In this case, the plurality of transmitters transmits the same signal. The service multiplexer multiplexes main service data for fixed reception and mobile service data for mobile reception. The transmitter modulates the multiplexed broadcasting data and transmits the modulated broadcasting data. Hereinafter, for convenience of description, a method for modulating the main service data for fixed reception and the mobile service data for mobile reception is called a mobile VSB (MVSB). If the broadcasting data for mobile reception is transmitted, the transmitter modulates the mobile service data for mobile reception such that the data can be stably received, regardless of various distortions or noise which may occur in a transmission channel.

A broadcasting signal receiver can compensate for the signal distortions and restore the broadcasting signal. Data communication between the service multiplexer and the transmitter, both of which are separated from each other, may be performed by various methods. For example, the standard such as synchronous serial interface for transport of MPEG-2 data (SMPTE-310M) may be used.

Figure 13:
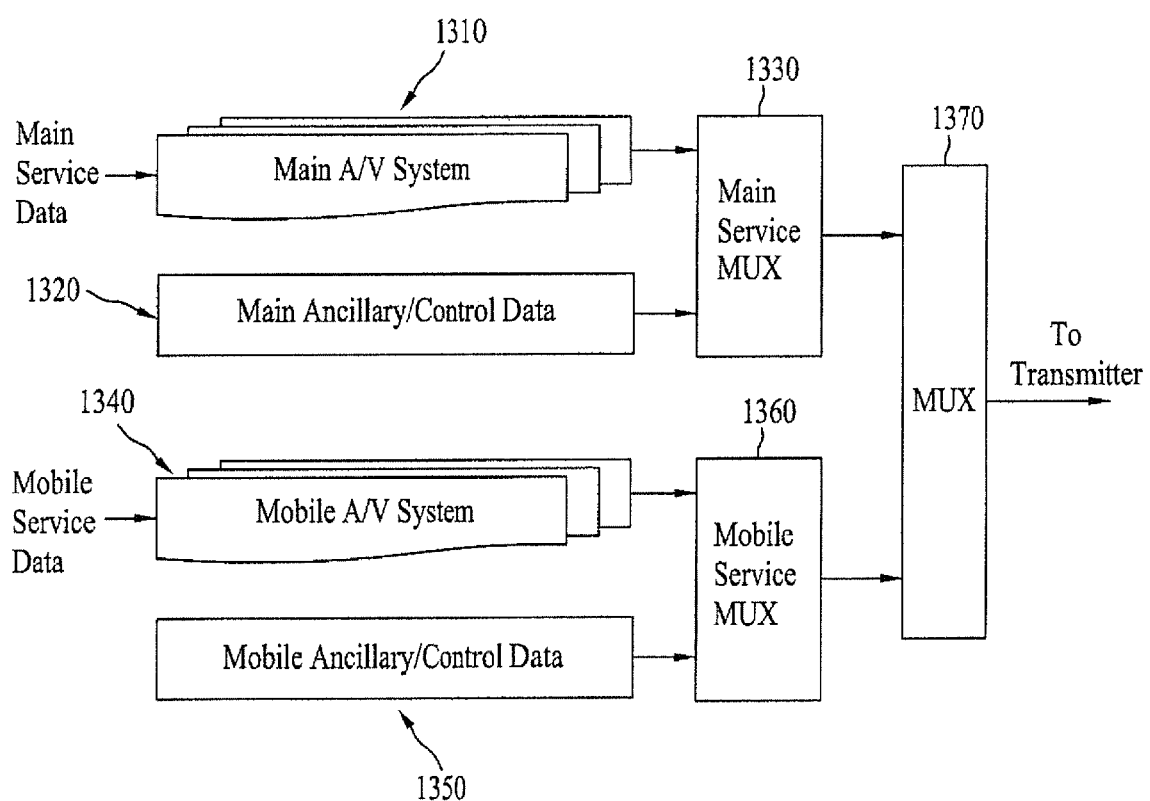
FIG. 13 is a block diagram of a broadcast system according to one embodiment of the present invention.

FIG. 13 is a view showing an example of the service multiplexer shown in FIG. 12 in the broadcasting signal receiver according to the embodiment.

The service multiplexer includes a main audio/video (A/V) system 1310, main ancillary/control data system 1320, a mobile A/V system 1340, a mobile ancillary/control data system 1350, a main service multiplexer 1330, a mobile service multiplexer 1360 and a transmission service multiplexer 1370.

Main service data is encoded and compressed by the main A/V system 1310 and is output to the main service multiplexer 1330. If the number of types of main service data is greater than one, a plurality of main A/V systems may be included.

The main service multiplexer 1330 multiplexes the output of the main A/V system 1310 and various types of additional data of the main service and outputs the multiplexed data to the transmission service multiplexer 1370.

Similarly, mobile service data is encoded and compressed by the mobile A/V system 1340 and is output to the mobile service multiplexer 1360. If the number of types of mobile service data is greater than one, a plurality of mobile A/V systems may be included.

The mobile service multiplexer 1360 multiplexes the output of the mobile A/V system 1340 and various types of additional data of the mobile service and outputs the multiplexed data to the transmission service multiplexer 1370.

The transmission service multiplexer 1370 multiplexes the output of the main service multiplexer 1330 and the output of the mobile service multiplexer 1360 and outputs the multiplexed data to the transmitter. The output data of the transmission service multiplexer 1370 may be expressed in the form of an MPEG-2 transport stream (TS) packet.

The transmission service multiplexer 1370 can transmit the service data to the transmitter at a constant data rate. The transmission service multiplexer 1370 can transmit the service data to the transmitter at a constant data rate even when the service data transmitted to the transmitter includes only the main service data or both the main service data and the mobile service data. For example, if the transmission service multiplexer 1370 transmits the data to the transmitter at 19.39 Mbps, the mobile service data is multiplexed with the main service data and is transmitted within 19.39 Mbps. The mobile service data may be subjected to be error correction coding process in the transmitter and thus the data rate of the mobile service data may be reduced in consideration of the error correction encoding process.

If the output of the service multiplexer needs to be maintained at the constant data rate, for example, 19.39 Mbps, at least one of the main service multiplexer, the mobile service multiplexer and the transmission data multiplexer may insert null data or null packet in the multiplexed data so as to match the data rate of the final output to the constant data rate. Here, the null data may be generated in the multiplexer or may be received from an external device.

FIG. 14 is a view illustrating reception of broadcasting data at the time of occurrence of the handover, by the method for transmitting/receiving the broadcasting signal according to the embodiment.

Transmission data obtained by multiplexing the main service data M and mobile service data E1 and E2 may be transmitted to each cell. The main service data and the mobile service data may be multiplexed on a time axis and may be transmitted in the form of a burst, and desired broadcasting service data can be obtained by turning on/off the receiver only in a time period when the desired broadcasting service data is transmitted. For example, if broadcasting data E1 is obtained in the cell A, the signal is received only in a time period when the broadcasting data E1 is transmitted. In time periods when the main service data and the broadcasting data E2 are received, the power of the receiving unit of the broadcasting signal receiver is turned off. In the case where the broadcasting signal receiver is turned on/off in order to receive the signal, the broadcasting signal receiver is turned on/off earlier than an actual reception period such that a tuner or a demodulator prepares for the signal reception. Even when the broadcasting signal receiver receives the broadcasting data E1 in the cell B, the similar operation with that of the cell A may be performed.

In the case where the broadcasting signal receiver receives the broadcasting data E1 while moving over a plurality of cells, the broadcasting signal receiver can continuously receive the same broadcasting data (for example, E1) although the handover occurs in the broadcasting signal receiver.

Figure 15:
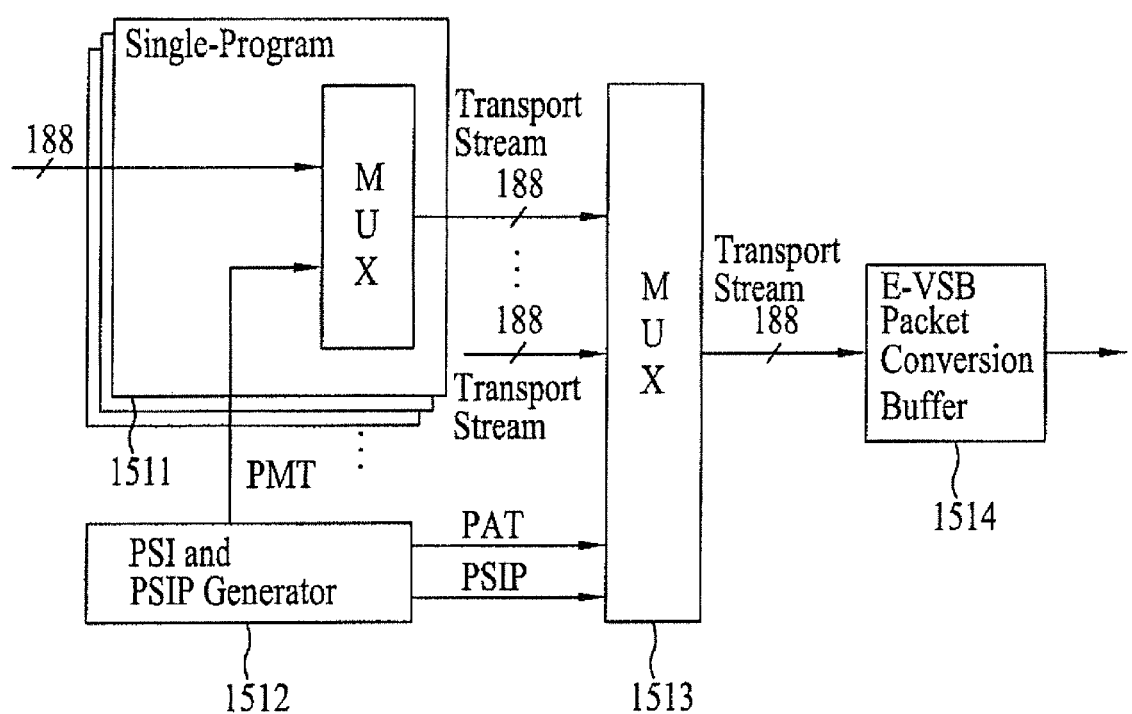
FIG. 15 is a block diagram of a mobile service multiplexer in FIG. 13 according to one embodiment of the present invention.

FIG. 15 is a view showing an example of a mobile service multiplexer of the service multiplexer shown in FIG. 13.

The mobile service multiplexer includes a first multiplexer 1511, a program table information generator 1512, a second multiplexer 1513 and a packet conversion buffer 1514.

The first multiplexer 1511 multiplexes mobile data of an MPEG-2 TS format and program table information, such as a PMT, generated by the program table information generator 1512 and outputs the multiplexed data to the second multiplexer 1513. The program table information generator 1512 generates information according to program specific information (PSI) or program and system information protocol (PSIP). The PSI includes information such as the PMT and a program association table (PAT), and the PSIP includes a system time table (STT), a rating region table (RRT), a master guide table (MGT), a virtual channel table (VCT), an event information table (EIT) and an extended text table (ETT).

Hereinafter, the information on the broadcasting signal which is transmitted in the form of at least one section, such as the PSI/PSIP, is called the program table information.

Yet, if the receiver is previously provided with information on transport channels broadcasted in the respective cells, it is able to ignore the information occurring in the program table information generating unit 1512. And, it can be used for upgrade in special case that the corresponding information is changed.

The program table information generator 1512 can generate the program table information for delivering information on the channel of each cell. Hereinafter, the program table information including the cell information such as the channel information of the cell is called a CIT. Yet, if the corresponding receiver is previously provided with cell information, it is able to ignore the cell information or use the cell information for upgrade.

Each broadcasting station may allocate the information on the cell, which is an area of a signal transmitted by the broadcasting station, to the CIT and transmit the CIT. Since the CIT can transmit the channel information according to the cell divided by the broadcasting station for allocating the CIT, the broadcasting stations may transmit CITs having different contents.

The second multiplexer 1513 multiplexes the output of the first multiplexer 1511 and the output of the program table information generator 1512 and outputs the multiplexed signal to the packet conversion buffer 1514. The first multiplexer 1511 includes a plurality of multiplexers for multiplexing plural pieces of mobile service data and the PMT of the data.

Here, one mobile service data may become a single program. Information on a physical layer for real-time broadcasting, that is, information such as time slicing of a transmission signal and a burst length, may be included in the program table information.

The packet conversion buffer 1514 adjusts 188-byte transport stream output from the second multiplexer 1513 to a block length required in a preprocessor which will be described later.

Figure 16:
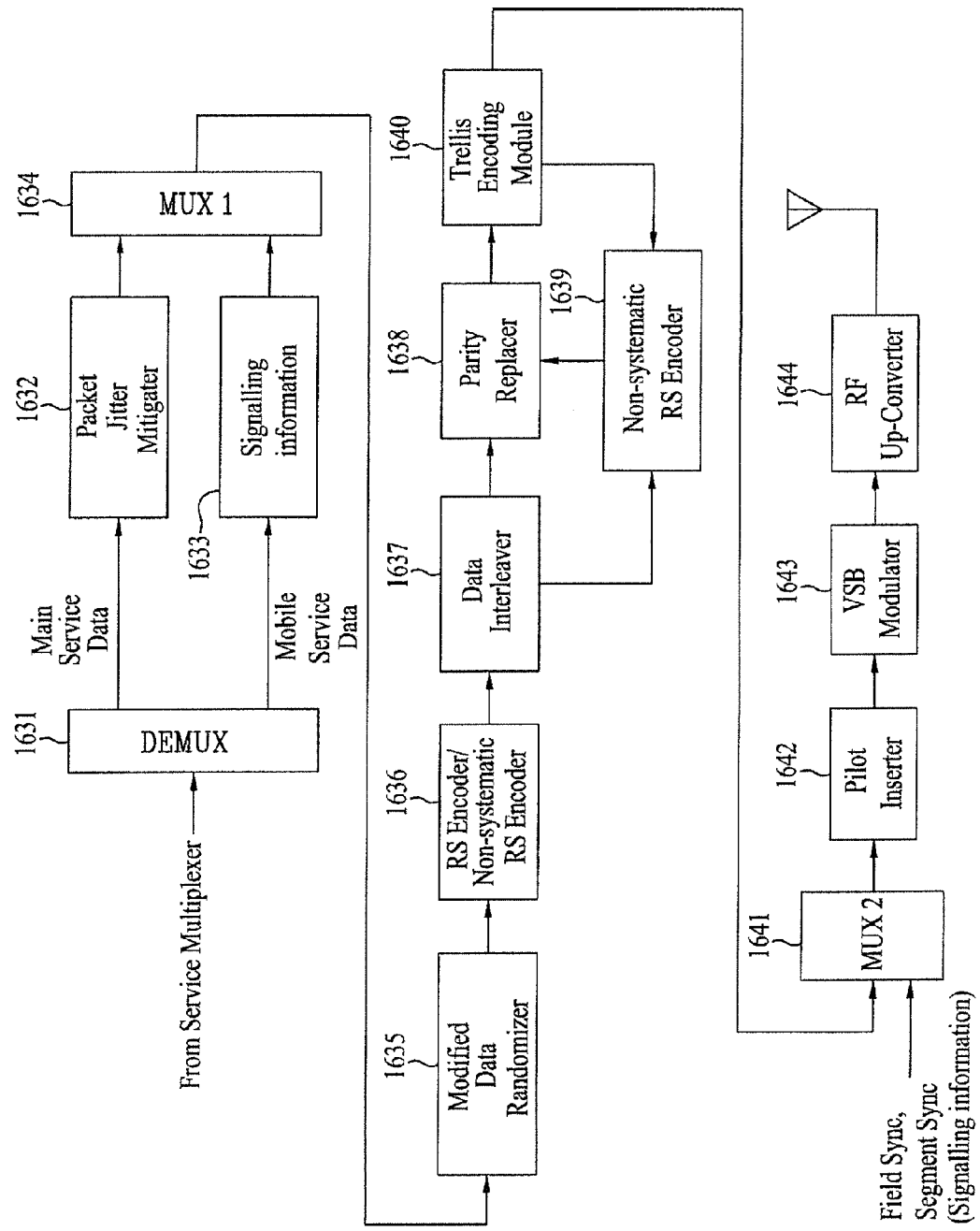
FIG. 16 is a block diagram of a transmitter in FIG. 12 according to one embodiment of the present invention.

FIG. 16 is a block diagram showing an example of the transmitter shown in FIG. 12.

The transmitter includes a demultiplexer 1631, a packet jitter mitigater 1632, an M-VSB preprocessor 1633, a first transmission data multiplexer 1634, a data randomizer 1635, an RS encoder/non-systematic RS encoder 1636, a data interleaver 1637, a parity replacer 1638, a non-systematic RS encoder 1639, a trellis encoding module 1640, a second transmission data multiplexer 1641, a pilot inserter 1642, a VSB modulator 1643, and an RF up-converter 1644.

The demultiplexer 1631 of the transmitter demultiplexes the data received from the transmission service multiplexer 1370, divides the data into the main service data and the mobile service data, outputs the divided main service data to the packet jitter mitigater 332, and outputs the mobile service data to the M-VSB preprocessor 333.

If the transmission service multiplexer 1370 inserts the null data into the data and then transmits the data in order to match the data rate to the constant data rate, the demultiplexer 1631 discards the null data by referring to the identifier which is transmitted together, processes only the remaining data, and outputs the processed data to a corresponding block. The demultiplexer 1631 may configure other information, such as control information necessary for transmission in the null data, and transmit the null data.

The M-VSB preprocessor 1633 performs an additional encoding process with respect to the mobile service data in order to rapidly cope with noise and a channel variation. The mobile service data divided by the demultiplexer 1631 is output to the M-VSB preprocessor 1633. The M-VSB preprocessor 1633 may randomize the mobile service data and perform an error correction coding process.

If the M-VSB preprocessor 1633 performs the randomizing process, the data randomizer 1635 of the next stage may omit the randomizing process of the mobile service data. The randomizer of the mobile service data may be equal to or different from a randomizer defined in the ATSC. The main service data packet and the mobile service data packet based on 188-byte units in data of a predetermined format output from the M-VSB preprocessor 1633 are multiplexed according to a predefined multiplexing method and are output to the data randomizer 1635. The multiplexing method can be adjusted by various variables of the system design.

In the method for multiplexing the data by the first transmission data multiplexer 1634, as shown in FIG. 14, a burst period is provided on the time axis, a plurality of data groups may be transmitted in the burst period and only the main service data may be transmitted in a non-burst period. In contrast, the main service data may be transmitted in the burst period. That is, as shown in FIG. 14, a plurality of successive mobile service packets forms one data group and the plurality of data groups is mixed with the main service data packets so as to form one burst. The mobile service data or the main service data may be transmitted in one burst period.

The main service data may exist in the burst period or the non-burst period. The numbers of main data packets in the main service data period of the burst period and the main service data period of the non-burst period may be different from or equal to each other.

If the mobile service data is transmitted in the burst structure, the broadcasting signal receiver for receiving only the mobile service data is turned on only in the burst period so as to receive the data and is turned off in the period in which only the main service data is transmitted, thereby reducing the power consumption of the receiver.

The packet jitter mitigater 1632 readjusts a relative location of the main service data packet such that overflow or underflow does not occur in the buffer of the decoder in the broadcasting signal receiver. Since the mobile service data group is multiplexed with the main service data in the packet multiplexing process, the temporal location of the main service packet is relatively changed.

The decoder (for example, the MPEG decoder) of the device for processing the main service data of the broadcasting signal receiver may receive and decode only the main service data, recognize the mobile service data packet as the null packet, and discard the mobile service data packet. Accordingly, when the decoder of the broadcasting signal receiver receives the main service data packet multiplexed with the mobile service data group, packet jitter may occur.

Since the decoder of the receiver includes multi-stage buffers for video data and has a large size, the first transmission data multiplexer 1634 may generate the packet jitter. Due to the packet jitter, overflow or underflow may occur in the buffer for the main service data of the broadcasting signal receiver, for example, the buffer for audio data.

The packet jitter mitigater 1632 knows the multiplexing information of the first transmission data multiplexer 1634. If it is assumed that the audio data packets are normally processed, the packet jitter mitigater 1632 may rearrange the audio data packets of the main service as follows.

First, if one audio data packet is included in the main service data period of the burst period, for example, in the main service data period interposed between two mobile service data groups, the audio data packet is arranged at a foremost location of the main service data period, if two audio data packets are included in the main service data period of the burst period, the audio data packets are arranged at foremost and hindmost locations of the main service data period, and if at least three audio data packets are included in the main service data period of the burst period, two audio data packets are arranged at the foremost and hindmost locations of the main service data period and the remaining audio data packet is arranged there between at a uniform interval. Second, the audio data packet is arranged at a hindmost location in the main service data period before the start of the burst period. Third, the audio data packet is arranged at a foremost location in the main service data period after the completion of the burst period. The packets other than the audio data are arranged in a period excluding the locations of the audio data packets in input order.

If the locations of the main service data packets are relatively readjusted, a program clock reference (PCR) value is corrected. The PCR value is a time reference value for setting the time of the MPEG decoder, which is inserted into a specific area of a TS packet and is transmitted. The packet jitter mitigater 1632 may correct the PCR value.

The output of the packet jitter mitigater 1632 is input to the first transmission data multiplexer 1634. The first multiplexer 1634 multiplexes the main service data output from the packet jitter mitigater 1632 and the mobile service data output from the M-VSB preprocessor 1633 to the burst structure according to the predefined multiplexing rule and outputs the burst structure to the data randomizer 1635.

The data randomizer 1635 performs the same randomizing process as the existing randomizer if the received data is the main service data packet. That is, a sync byte in the main service data packet is discarded and the remaining 187 bytes are randomized using a pseudo random byte generated therein and are output to the RS encoder/non-systematic RS encoder 1636.

However, if the received data is the mobile service data packet, the data randomizer 1635 may discard the sync byte of 4-byte MPEG header included in the mobile service data packet and randomize the remaining 3 bytes. The remaining mobile service data excluding the MPEG header is output to the RS encoder/non-system RS encoder 1636, without being randomized. In this case, the randomizing process is previously performed by the M-VSB preprocessor 1633. Known data (or a known data location holder) included in the mobile service data packet and an initialization data location holder may be randomized or may not be randomized.

The RS encoder/non-systematic RS encoder 1636 performs RS encoding process with respect to the data randomized by the data randomizer 1635 or bypassed data so as to add a 20-byte RS parity and then outputs the encoded data to the data interleaver 1637. At this time, if the received data is the main service data packet, the RS encoder/non-system RS encoder 1636 performs a systematic RS encoding process so as to add the 20-byte RS parity to the back of the 187-byte data, similar to an ATSC VSB system. If the received data is the mobile service data packet, the 20-byte RS parity obtained by performing the non-systematic RS encoding process is inserted at the parity byte location decided in the packet.

The data interleaver 1637 performs a convolutional interleaving process in the unit of bytes. The output of the data interleaver 1637 is input to the parity replacer 1638 and the non-systematic RS encoder 1639.

The memory of the trellis encoding module 1640 may be first initialized such that output data of the trellis encoding module 1640 located at the next stage of the parity replacer 1638 is set to known data defined by the agreement between the transmitter and the receiver. The memory of the trellis encoding module 1640 is first initialized before the received known data sequence is trellis-encoded.

If a start part of the received known data sequence is the initialization data location holder inserted by the M-VSB preprocessor 1633, initialization data is generated and is replaced with the trellis memory initialization data location holder immediately before the received known data sequence is trellis-encoded.

The value of the trellis memory initialization data is decided and generated according to the memory status of the trellis encoding module 1640. Due to the influence of the replaced initialization data, the RS parity may be calculated again and may be replaced with the RS parity output from the data interleaver 1637.

The non-systematic RS encoder 1639 receives the mobile service data packet including the initialization data location holder, which will be replaced with the initialization data, from the data interleaver 1637 and receives the initialization data from the trellis encoding module 1640. The initialization data location holder of the received mobile service data packet is replaced with the initialization data, the RS parity data added to the mobile service data packet is removed, and a new non-systematic RS parity is calculated and is output to the parity replacer 1638. Then, the parity replacer 1638 selects the output of the data interleaver 1637 with respect to the data in the mobile service data packet, selects the output of the non-systematic RS encoder 1639 with respect to the RS parity, and outputs the selected data to the trellis encoding unit 1640.

If the main service data packet is received or if the mobile service data packet no including the initialization data location holder to be replaced is received, the parity replacer 1638 selects and outputs the RS parity and the data output from the data interleaver 1637 to the trellis encoding module 1640 without alteration.

The trellis encoding module 1640 converts the data based on byte units into the data based on symbol units, performs 12-way interleaving, performs the trellis encoding process, and outputs the encoded data to the second transmission data multiplexer 1641.

The second transmission data multiplexer 1641 inserts a field sync signal and a segment sync signal to the output of the trellis encoding module 1640 and outputs the inserted data to the pilot inserter 1642. The data into which the pilot is inserted by the pilot inserter 1642 is VSB-modulated by the VSB modulator 1643 and is transmitted to the broadcasting signal receiver through the RF up-converter 1643.

The transmitter transmits various transmission parameters of the transmission signal such as the main service data or the mobile service data and the broadcasting signal receiver needs to receive the transmission parameters of the transmitted signal in order to normally receive the transmitted signal. For example, in order to transmit the mobile service data, information indicating how the signals of the symbol area are encoded is required and information indicating how the main service data and the mobile service data are multiplexed is required. A cell identifier may be required in the multi-frequency network environment. Here, information on the transmission parameter is called signaling information. In the embodiment shown in FIG. 16, the signaling information may be inserted by the preprocessor 1633 or the second transmission data multiplexer 1641 so as to be transmitted. If the second transmission data multiplexer 1641 inserts the signaling information, the signaling information may be inserted into a field sync segment area.

Figure 17:
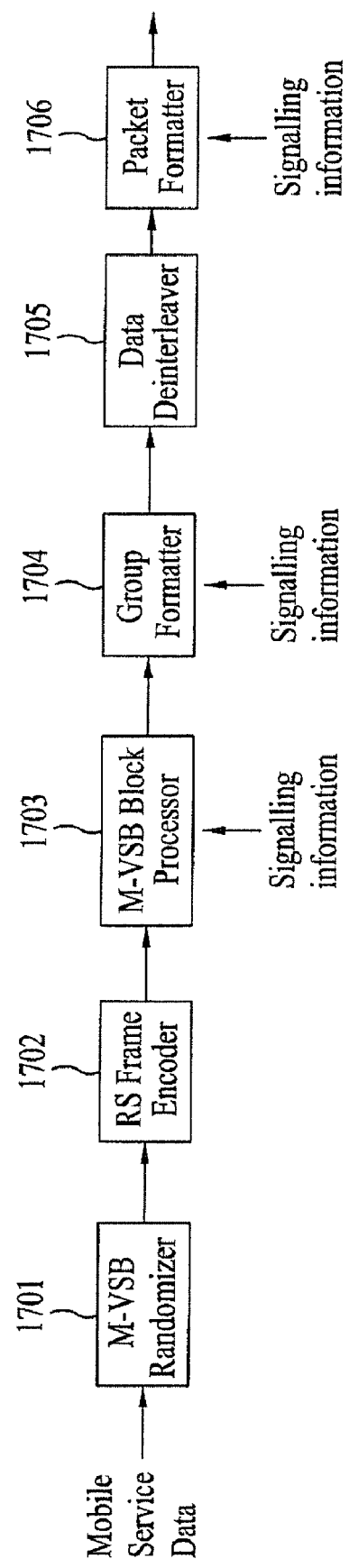
FIG. 17 is a block diagram of a pre-processing unit in FIG. 16 according to one embodiment of the present invention.

FIG. 17 is a view showing an example of the preprocessor shown in FIG. 16. The preprocessor shown in FIG. 16 may include an M-VSB data randomizer 1701, a RS frame encoder 1702, an M-VSB block processor 1703, a group formatter 1704, a data deinterleaver 1705 and a packet formatter 1706.

The M-VSB randomizer 1701 randomizes the received mobile service data and outputs the randomized data to the RS frame encoder 402, for error correction encoding. If the M-VSB randomizer 1701 randomizes the mobile service data, the data randomizer 1635 located at the next stage thereof may omit the randomizing process of the mobile service data.

The RS frame encoder 1702 performs the error correction encoding process with respect to the randomized mobile service data. If the RS frame encoder 1702 performs the error correction encoding process, burst error which may occur by a variation in propagation environment is distributed while making the mobile service data robust so as to cope with the propagation environment which rapidly varies. The RS frame encoder 402 may include a process of mixing mobile service data having a predetermined size in the unit of data rows.

Hereinafter, as one embodiment, the error correction encoding process may be performed by performing the RS encoding method or the cyclic redundancy check (CRC) encoding method. If the RS encoding method is performed, parity data which will be used for error correction is generated and, if the CRC encoding method is performed, CRC data which will be used for error detection is generated.

The RS encoding method may use a forward error correction (FEC) structure. The CRC data generated by the CRC encoding process may indicate whether the mobile service data is damaged by the error while being transmitted through the channel. The error correction encoding process may use other error detection encoding methods other than the CRC encoding method. Alternatively, the overall error correction capability of the receiver can be increased using the error correction encoding method. The mobile service data encoded by the RS frame encoder 402 is input to the M-VSB block processor 1703.

The M-VSB block processor 1703 encodes the received mobile service data at G/H encoding rate again and outputs the encoded data to the group formatter 1704. The M-VSB block processor 1703 separates the received mobile service data based on the byte units into data based on bit units, encodes the separated G-bit data to H-bit data, converts the data into data based on byte units, and outputs the data based on byte units. For example, if 1-bit input data is encoded to 2-bit data and the 2-bit data is output, G becomes 1 and H becomes 2. If 1-bit input data is encoded to 4-bit data and the 4-bit data is output, G becomes 1 and H becomes 4. In the present invention, for convenience of description, the former case is called encoding of ½ encoding rate (also called ½ encoding) and the latter case is called encoding of ¼ encoding rate (also called ¼ encoding). The ¼ encoding has higher error correction capability than the ½ encoding. Accordingly, the group formatter 1704 may allocate the data encoded at the ¼ encoding rate to an area having low reception capability and allocate the data encoded at the ½ encoding rate to an area having high reception capability, thereby reducing a difference in reception capability.

The M-VSB block processor 1703 may receive the signaling information included in the transmission parameter information. The data containing the signaling information may be subjected to the ½ encoding or the ¼ encoding. The signaling information is the information necessary for receiving and processing the data included in the data group by the broadcasting signal receiver and may include cell identifier information, data group information, multiplexing information and burst information.

The group formatter 1704 inserts the mobile service data output from the M-VSB block processor 1703 into a corresponding area in the data group formed according to a predetermined rule. In conjunction with the data deinterleaving, various types of location holders or known data may be inserted into the corresponding area in the data group. The data group may be separated into at least one layered area and the type of the mobile service data inserted into each area may vary according to the characteristics of the layered area. For example, each layered area may be classified according to the reception capability within the data group.

The group formatter 1704 may insert the signaling information such as the transmission parameter information into the data group independent of the mobile service data. When the generated known data is inserted into the corresponding area of the mobile service data group, the group formatter 1704 may insert the signaling information into at least a portion of the area into which the known data can be inserted, instead of the known data. For example, if a long known data sequence is inserted into the start part of a body area of the mobile service data group, the signaling information is inserted into a portion of the start part, instead of the known data. In this case, a portion of the known data sequence inserted into the remaining area excluding the area, into which the signaling information is inserted, may be used for capturing the start point of the mobile service data group and the other portion may be used for channel equalization in a reception system.

The group formatter 1704 may insert an MPEG header location holder, a non-systematic RS parity location holder and a main service data location holder in conjunction with the data deinterleaving of the next stage, in addition to the encoded mobile service data output from the M-VSB block processor 1703.

The reason why the main service data location holder is inserted is because an area in which the mobile service data and the main service data are mixed exists on the basis of the data after the data interleaving. For example, the location holder for the MPEG header is allocated to the foremost location of each packet on the basis of the output data after the data deinterleaving.

The group formatter 1704 may insert the known data generated by a predetermined method or insert the known data location holder for inserting the known data later. The location holder for initialization of the trellis encoding module may be inserted into a previous area of the known data sequence. The size of the mobile service data which can be inserted into one data group may vary according to initialization of the trellis inserted into the data group or the size of the known data, the MPEG header and the RS parity.

The data deinterleaver 1705 deinterleaves the data and the location holder in the data group output from the group formatter 1704 as the inverse process of the interleaving and outputs the deinterleaved data to the packet formatter 1706.

The packet formatter 1706 may remove the main service data location holder and the RS parity location holder allocated for the deinterleaving, add 1-byte MPEG sync signal to a 3-byte MPEG header location holder with respect to the remaining data portions, and insert a 4-byte MPEG header.

If the group formatter 1704 inserts the known data location holder, the packet formatter 1706 may include actual known data to the known data location holder and output the known data location holder without adjustment. Then, the packet formatter 1706 divides the data in the packet-formatted data group into mobile service data packets (that is, the MPEG TS packets) based on 188-byte units and outputs the divided data to the multiplexer. The packet formatter 1706 may insert the signaling information into at least a portion of the known data area instead of the known data and output the inserted data. If the known data location holder is inserted into the start part of the body area of the mobile service data group, the signaling information may be inserted into a portion of the known data location holder.

If the signaling information is inserted, the inserted signaling information may be block-encoded for a short period and may be inserted or a predefined pattern may be inserted according to the signaling information. The body areas of the mobile service data group may have different known data patterns. Accordingly, in the reception system, only symbols in a promised period may be divided from the known data sequence and be recognized as the signaling information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A receiving system comprising:
   a module configured to receive location information identifying a current location of the receiving system;
   a tuner configured to receive a broadcasting signal comprising mobile service data, known data sequences, segment synchronization data, field synchronization data and a cell information table including cell information, wherein the cell information includes cell location information for defining a location of each cell and transport stream identification information for identifying the broadcasting signal carrying the mobile service data;

a demodulator configured to demodulate the received broadcasting signal;

a channel equalizer configured to compensate channel distortion of the demodulated broadcasting signal based on at least one of the known data sequences;

a first decoder configured to perform cyclic redundancy check (CRC) decoding and Reed-Solomon (RS) decoding on an RS frame including mobile service data in the channel distortion compensated broadcasting signal to correct at least one error in the RS frame;

a second decoder configured to extract the cell information from the error-corrected RS frame; and a controller configured to control the tuner based on the extracted cell information to facilitate continuous watching by a user of a same mobile service when traveling from a coverage area of one transmitter to a coverage area of another transmitter.

2. The receiving system of claim 1, further comprising:

a display unit configured to output the mobile service data in the error-corrected RS frame.

3. The receiving system of claim 1, wherein the module comprises at least a Global Positioning System (GPS) receiver or a Dead-Reckoning (DR) sensor.

4. The receiving system of claim 3, wherein the controller is further configured to control reception of input from the user regarding a destination.

5. The receiving system of claim 4, wherein the controller is further configured to control reception of routing information that is routed according to the input received from the user.

6. The receiving system of claim 5, wherein the controller is further configured to control extraction of the cell information matching at least the received routing information or the received location information.

7. The receiving system of claim 6, wherein the controller is further configured to control selection of a cell having a largest magnitude of signal power among each cell according to the extracted cell information.

8. The receiving system of claim 6, wherein the controller is further configured to control selection of at least a nearest cell to a current cell or a next cell into which the receiving system will move according to the extracted cell information.

9. The receiving system of claim 1, wherein the cell information table is applied to a Multi-Frequency network (MFN) environment.

* * * * *